United States Patent
Edmonston et al.

(10) Patent No.: US 11,552,312 B2
(45) Date of Patent: Jan. 10, 2023

(54) FUEL CELL SYSTEM INCLUDING ATO INJECTOR AND METHOD OF OPERATING THE SAME

(71) Applicant: BLOOM ENERGY CORPORATION, San Jose, CA (US)

(72) Inventors: David Edmonston, Soquel, CA (US); David Weingaertner, Sunnyvale, CA (US); Michael Petrucha, Santa Clara, CA (US); Ivan Hartana, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 154 days.

(21) Appl. No.: 16/929,229

(22) Filed: Jul. 15, 2020

(65) Prior Publication Data
US 2021/0020967 A1    Jan. 21, 2021

Related U.S. Application Data

(60) Provisional application No. 62/874,039, filed on Jul. 15, 2019.

(51) Int. Cl.
*H01M 8/04089*   (2016.01)
*H01M 8/10*   (2016.01)

(52) U.S. Cl.
CPC ......... *H01M 8/04097* (2013.01); *H01M 8/10* (2013.01)

(58) Field of Classification Search
None
See application file for complete search history.

(56) References Cited

U.S. PATENT DOCUMENTS

| | | |
|---|---|---|
| 8,852,820 B2 | 10/2014 | Perry et al. |
| 8,968,943 B2 | 3/2015 | Perry et al. |
| 9,190,658 B2 | 11/2015 | Ryu et al. |
| 9,190,673 B2 | 11/2015 | Venkataraman et al. |
| 9,190,685 B2 | 11/2015 | McElroy et al. |
| 9,287,572 B2 | 3/2016 | Weingaertner et al. |

(Continued)

FOREIGN PATENT DOCUMENTS

WO    WO2016196952 A1    12/2016

OTHER PUBLICATIONS

Notification of Transmittal of the International Search Report and Written Opinion of the International Search Authority for International Patent Application No. PCT/US2020/042035, dated Oct. 28, 2020, 13 pages.

(Continued)

*Primary Examiner* — Alix E Eggerding
(74) *Attorney, Agent, or Firm* — The Marbury Law Group PLLC

(57) ABSTRACT

A fuel cell system includes a fuel cell stack, an anode tail gas oxidizer (ATO), an ATO injector configured to mix a first portion of an anode exhaust from the fuel cell stack with a cathode exhaust from the fuel cell stack and to provide a mixture of the first portion of the anode exhaust and the cathode exhaust into the ATO, an anode exhaust conduit which is configured to provide the first portion of the anode exhaust into the ATO injector, and cathode exhaust conduit which is configured to provide at least a portion of the cathode exhaust from the fuel cell stack into the ATO injector. The ATO injector includes injector tubes or injection apertures.

15 Claims, 18 Drawing Sheets

(56) References Cited

U.S. PATENT DOCUMENTS

| | | |
|---|---|---|
| 9,520,602 B2 | 12/2016 | Venkataraman et al. |
| 10,173,178 B1 | 1/2019 | Deshpande et al. |
| 10,186,724 B2 | 1/2019 | Gasda et al. |
| 2010/0178574 A1 | 7/2010 | Valensa |
| 2012/0015258 A1 | 1/2012 | Valensa et al. |
| 2012/0178003 A1* | 7/2012 | Venkataraman .. H01M 8/04007 429/408 |
| 2012/0196195 A1 | 8/2012 | Perry et al. |
| 2013/0108936 A1 | 5/2013 | McElroy et al. |
| 2015/0111121 A1 | 4/2015 | Weingaertner et al. |
| 2016/0043413 A1 | 2/2016 | McElroy et al. |
| 2016/0064748 A1 | 3/2016 | Venkataraman et al. |
| 2016/0248111 A1 | 8/2016 | Gasda et al. |
| 2018/0301718 A1* | 10/2018 | Kakuwa ................ H01M 8/12 |
| 2019/0140297 A1 | 5/2019 | Gasda et al. |
| 2021/0218044 A1* | 7/2021 | Jahnke .................... F02C 1/00 |

OTHER PUBLICATIONS

Notification Concerning Transmittal of International Preliminary Report on Patentability and Written Opinion of the International Search Authority for international Patent Application No. PCT/US2020/042035, dated Jan. 27, 2022, 9 pages.

\* cited by examiner

FUEL CELL SYSTEM INCLUDING ATO INJECTOR AND METHOD OF OPERATING THE SAME

FIELD

Aspects of the present invention relate to anode tail gas oxidizer (ATO) injectors and fuel cell systems including the same.

BACKGROUND

Fuel cells, such as solid oxide fuel cells, are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to various embodiments, a fuel cell system includes a fuel cell stack, an anode tail gas oxidizer (ATO), an ATO injector configured to mix a first portion of an anode exhaust from the fuel cell stack with a cathode exhaust from the fuel cell stack and to provide a mixture of the first portion of the anode exhaust and the cathode exhaust into the ATO, an anode exhaust conduit which is configured to provide the first portion of the anode exhaust into the ATO injector, and cathode exhaust conduit which is configured to provide at least a portion of the cathode exhaust from the fuel cell stack into the ATO injector. The ATO injector includes a hollow cylindrical body, and injection tubes extending from an outer surface of the hollow cylindrical body and configured to inject the first portion of the anode exhaust into the swirled cathode exhaust.

According to various embodiments of the present disclosure, a method of operating fuel cell system includes splitting an anode exhaust from a fuel cell stack by providing a first portion of the anode exhaust through injection tubes extending from an outer surface of a hollow cylindrical body of an anode tail gas oxidizer (ATO) injector, providing at least a portion of a cathode exhaust from the fuel cell stack into the ATO injector, swirling the cathode exhaust in the ATO injector using vanes disposed on the outer surface of the hollow cylindrical body, mixing the swirled cathode exhaust with the first portion of the anode exhaust, providing a mixture of the first portion of the anode exhaust and the swirled cathode exhaust into an anode tail gas oxidizer (ATO), passing a second portion of the anode exhaust past the injection tubes, and recycling the second portion of the anode exhaust into a fuel inlet stream provided into the fuel cell stack.

In one embodiment, the method may also include providing the anode exhaust from the fuel cell stack into an anode recuperator heat exchanger, exchanging heat between the anode exhaust and the fuel inlet stream prior to splitting the anode exhaust into the first portion and the second portion, and providing the anode exhaust from the anode recuperator heat exchanger to the ATO injector.

According to various embodiments of the present disclosure, a method of operating a fuel cell system includes providing at least a portion of a cathode exhaust from a fuel cell stack into an anode tail gas oxidizer (ATO) injector, swirling the cathode exhaust in the ATO injector using vanes, providing at least a first portion of an anode exhaust from the fuel cell stack through the ATO injector comprising an arcuate body comprising injection apertures, injecting at least the first portion of the anode exhaust from the arcuate body through the injection apertures into the swirled cathode exhaust; and providing a mixture of the at least the first portion of the anode exhaust and the swirled cathode exhaust into an anode tail gas oxidizer (ATO).

According to various embodiments of the present disclosure, a fuel cell system includes a fuel cell stack, an anode recuperator heat exchanger configured to receive an anode exhaust from the fuel cell stack, an anode exhaust conduit configured to receive the anode exhaust from the anode recuperator, a cathode exhaust conduit configured to receive a cathode exhaust from the fuel cell stack, an anode tail gas oxidizer (ATO) surrounding the anode recuperator and configured to receive the cathode exhaust from the cathode exhaust conduit, an ATO injector located between the ATO and the anode exhaust conduit, a carbon dioxide separator fluidly connected to the anode exhaust conduit and to the an ATO injector. The carbon dioxide separator is configured to separate carbon dioxide from the anode exhaust, and the anode exhaust conduit bypasses and is not directly fluidly connected to the an ATO injector.

According to various embodiments of the present disclosure, a fuel cell system includes a fuel cell stack, an anode recuperator heat exchanger configured to receive an anode exhaust from the fuel cell stack, an anode exhaust conduit configured to receive the anode exhaust from the anode recuperator, a cathode exhaust conduit configured to receive a cathode exhaust from the fuel cell stack, an anode tail gas oxidizer (ATO) surrounding the anode recuperator and configured to receive the cathode exhaust from the cathode exhaust conduit, and an ATO injector located between the ATO and the anode exhaust conduit. The ATO injector includes vanes configured to swirl the cathode exhaust provided from the cathode exhaust conduit, and an arcuate body disposed between the anode exhaust conduit and the ATO and through which at least a portion of the anode exhaust is configured to flow from the anode exhaust conduit, the arcuate body comprising injection apertures configured to inject at least a portion of the anode exhaust into the swirled cathode exhaust flowing to the ATO.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Figure 1A:
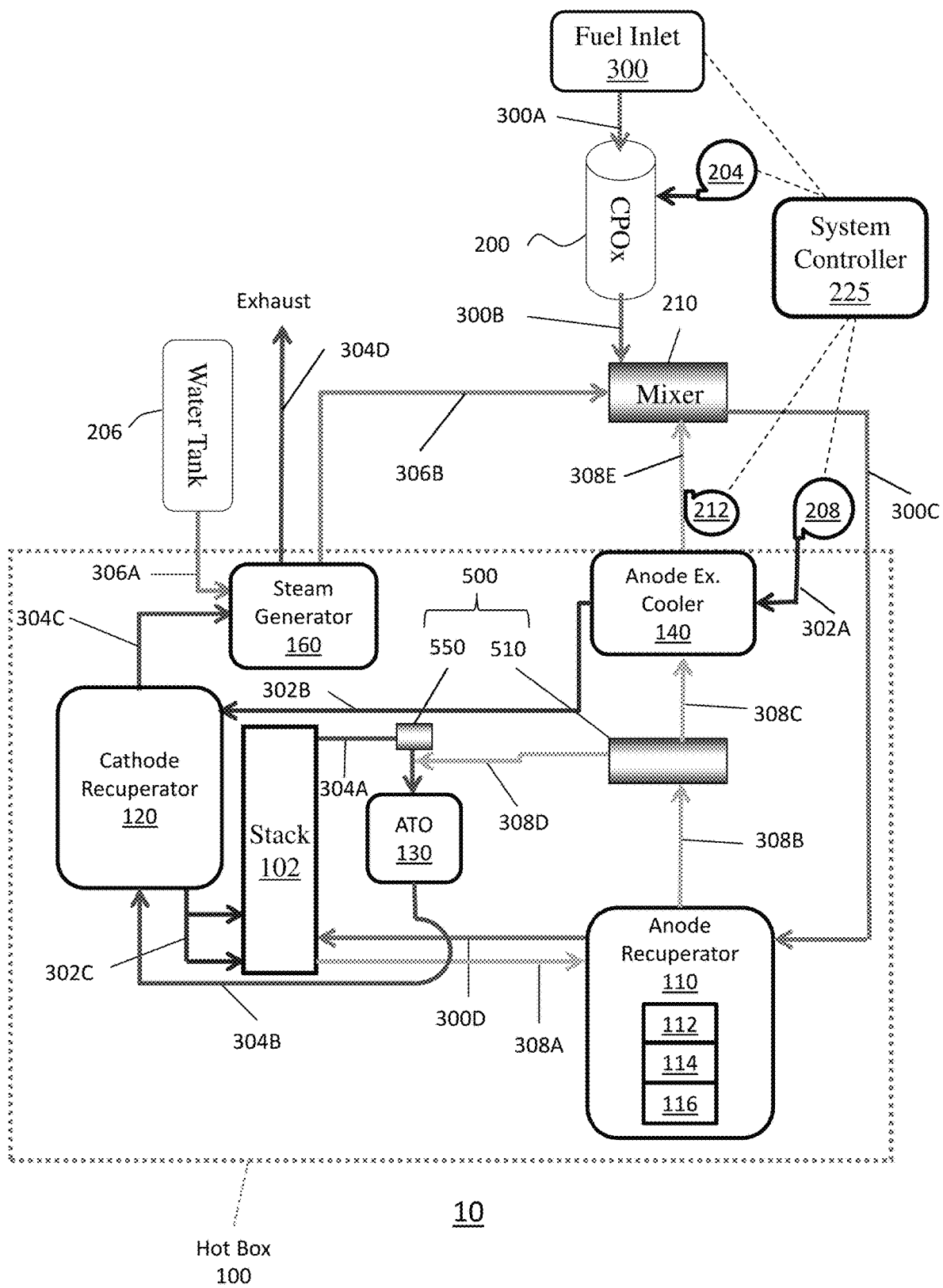
FIGS. 1A, 1B, 1C and 1D are schematics of a SOFC fuel cell system, according to various embodiments of the present disclosure.

FIG. 1A is a schematic representation of a solid oxide fuel cell (SOFC) system 10, according to an embodiment of the present disclosure. Referring to FIG. 1A, the system 10 includes a hotbox 100 and various components disposed therein or adjacent thereto.

The hot box 100 may contain fuel cell stacks 102, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 102 may be arranged over each other in a plurality of columns.

The hot box 100 may also contain an anode recuperator 110, a cathode recuperator 120, an anode tail gas oxidizer (ATO) 130, an anode exhaust cooler 140, an ATO mixer/injector (which is referred herein as an ATO injector for brevity) 500 including a splitter 510 and a vortex generator 550, and a steam generator 160. The system 10 may also include a catalytic partial oxidation (CPOx) reactor 200, a mixer 210, a CPOx blower 204 (e.g., air blower), a system blower 208 (e.g., air blower), and an anode recycle blower 212, which may be disposed outside of the hotbox 100. However, the present disclosure is not limited to any particular location for each of the components with respect to the hotbox 100.

The CPOx reactor 200 receives a fuel inlet stream from a fuel inlet 300, through fuel conduit 300A. The fuel inlet 300 may be a utility gas line including a valve to control an amount of fuel provided to the CPOx reactor 200. The CPOx blower 204 may provide air to the CPOx reactor 200 during system 10 start-up, and then turned off during steady-state operating mode when the fuel cell stacks 102 reach a steady-state operating temperature above 700° C., such as 750 to 900° C. The fuel in the steady state and/or a mixture of fuel and air during start-up may be provided to the mixer 210 by fuel conduit 300B. Fuel flows from the mixer 210 to the anode recuperator 110 through fuel conduit 300C. Fuel flows from the anode recuperator 110 to the stack 102 through fuel conduit 300D. The system 10 may also include one or more fuel reforming catalysts 112, 114, and 116 in the anode recuperator 110.

The main air blower 208 may be configured to provide an air stream (e.g., air inlet stream) to the anode exhaust cooler 140 through air conduit 302A. Air flows from the anode exhaust cooler 140 to the cathode recuperator 120 through air conduit 302B. The air flows from the cathode recuperator 120 to the stack 102 through air conduit 302C.

Anode exhaust (i.e., fuel exhaust) generated in the stack 102 is provided to the anode recuperator 110 through anode exhaust outlet conduit(s) 308A. The anode exhaust may contain unreacted fuel. The anode exhaust may also be referred to herein as fuel exhaust. The anode exhaust may be provided from the anode recuperator 110 to the splitter 510 by the anode exhaust conduit 308B. A first portion of the anode exhaust may be provided from the splitter 510 to the ATO 130 via an anode exhaust output conduit 308D. A second portion of the anode exhaust may be provided from the splitter 510 to the anode exhaust cooler 140 by a first anode exhaust recycling conduit 308C. Anode exhaust may be provided from the anode exhaust cooler 140 to mixer 210 by a second anode exhaust recycling conduit 308E. The anode recycle blower 212 may be configured to move anode exhaust though the second anode exhaust recycling conduit 308E, as discussed below.

Cathode exhaust (e.g., air exhaust) generated in the stack 102 flows to the ATO 130 through cathode exhaust conduit 304A. The cathode exhaust may also be referred to herein as air exhaust. The vortex generator 550 may be disposed in the cathode exhaust conduit 304A and may be configured to swirl the cathode exhaust. Conduit 308D may be fluidly connected to the cathode exhaust conduit 304A, downstream of the vortex generator 550. The swirled cathode exhaust exiting the vortex generator 550 may mix with the anode exhaust provided by the splitter 510 before being provided to the ATO 130. The mixture may be oxidized in the ATO 130 to generate ATO exhaust. The ATO exhaust flows from the ATO 130 to the cathode recuperator 120 through exhaust conduit 304B. Exhaust flows from the cathode recuperator 120 to the steam generator 160 through exhaust conduit 304C. Exhaust flows from the steam generator 160 and out of the hotbox 100 through exhaust conduit 304D.

Water flows from a water source 206, such as a water tank or a water pipe, to the steam generator 160 through water conduit 306A. The steam generator 160 converts the water into steam using heat from the ATO exhaust provided by exhaust conduit 304C. Steam is provided from the steam generator 160 to the mixer 210 through water conduit 306B. Alternatively, if desired, the steam may be provided directly into the fuel inlet stream and/or the anode exhaust stream may be provided directly into the fuel inlet stream followed by humidification of the combined fuel streams. The mixer 210 is configured to mix the steam with anode exhaust and fuel. This fuel mixture may then be heated in the anode recuperator 110, before being provided to the stack 102.

The system 10 may further a system controller 225 configured to control various elements (e.g., blowers 208 and 212 and the fuel control valve) of the system 10. The controller 225 may include a central processing unit configured to execute stored instructions. For example, the controller 225 may be configured to control fuel and/or air flow through the system 10, according to fuel composition data.

Figure 1B:
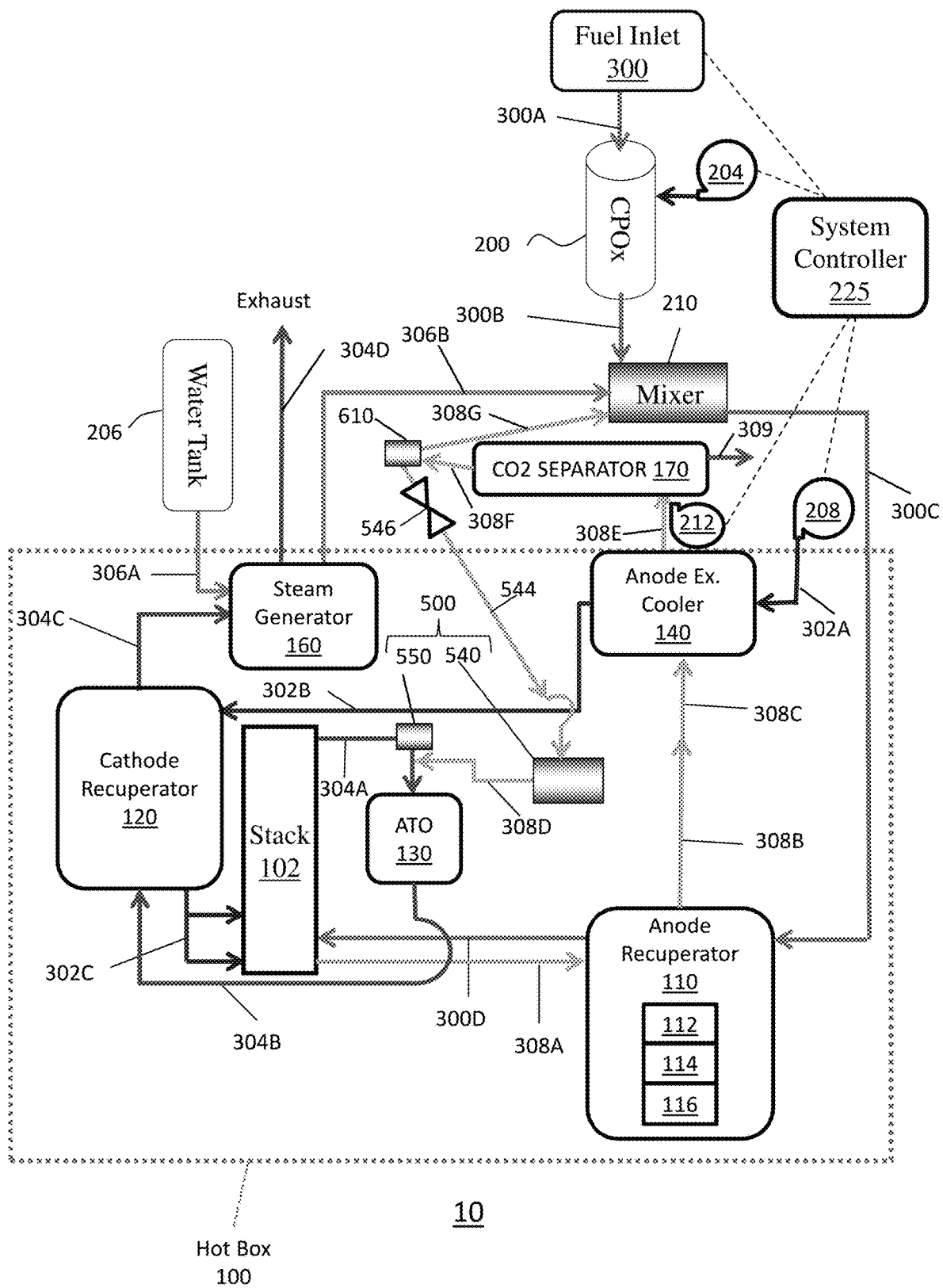

FIG. 1B is a schematic representation of a solid oxide fuel cell (SOFC) system 10 according to another embodiment of the present disclosure. The elements of system 10 of FIG. 1B that are the same as those of system 10 of FIG. 1A will not be described again for brevity.

The system 10 of FIG. 1B may be used with a hydrocarbon fuel, such as natural gas, methane, pentane, butane, biogas, etc. The system 10 of FIG. 1B includes an additional carbon dioxide separator 170 located between the anode exhaust cooler 140 and the mixer 210 in the anode exhaust path, a second mixer 610 and additional conduits 308F, 308G, 309 and 544. Conduit 544 may include an optional valve 546. In this embodiment, the ATO injector 500 may include the injector 540 shown in FIG. 8B which is described in more detail below. Furthermore, in this embodiment, the conduit 308B bypasses and is not directly fluidly connected to the injector 540. Specifically, the conduits 308B and 308C are merged into a single continuous portion of the anode exhaust conduit (which also includes conduit 308E located downstream from the anode exhaust cooler 140) which bypasses and is not directly fluidly connected to the injector 540.

The carbon dioxide separator 170 may comprise any mechanical (e.g., canister trap), adsorption (e.g., one or selective adsorption beds) or electrochemical separator which can separate carbon dioxide from other components of the anode exhaust (e.g., hydrogen, methane, carbon monoxide, etc.). Preferably, the carbon dioxide separator 170 comprises an electrochemical separator, such as a proton exchange membrane (PEM) cell or stack of PEM cells, as described in U.S. Pat. No. 9,190,658 B2, issued on Nov. 17, 2015 and incorporated herein by reference in its entirety.

The anode exhaust inlet of the carbon dioxide separator 170 is connected to conduit 308E. The carbon dioxide separator 170 may optionally also include a sweep gas inlet (e.g., air inlet, not expressly shown). The carbon dioxide separator 170 includes a purified anode exhaust conduit 308F and a carbon dioxide outlet conduit 309.

The system 10 of FIG. 1B operates as follows. Since the anode exhaust conduit (308B, 308C and 308E) bypasses and is not directly fluidly connected to the injector 540, the entire (i.e., 100% of) anode exhaust stream is provided from the anode recuperator 110 into the anode exhaust cooler 140 without flowing through the injector 540. The anode exhaust is provided from the anode exhaust cooler 140 by the anode recycle blower 212 into the anode exhaust inlet of the carbon dioxide separator 170 through conduit 308E. In one embodiment, if the anode exhaust in conduit 308E is still too hot for the anode recycle blower 212 or for the carbon dioxide separator 170, then an additional cooler using any external cooling fluid, such as air or water, may be be placed in conduit 308E, before or after the anode recycle blower 212 as needed,) to cool the anode exhaust to a suitable temperature. The carbon dioxide is separated from the anode exhaust in the carbon dioxide separator 170. The separated carbon dioxide is removed from the carbon dioxide separator 170 via conduit 309 for storage or industrial use (e.g., in chemical or industrial processes) outside the system 10. The purified anode exhaust from which all or a portion of carbon dioxide is removed is provided from the carbon dioxide separator 170 into the purified anode exhaust conduit 308F.

In one embodiment, the purified anode exhaust conduit 308F terminates in the second splitter 610. The second splitter 610 may be a T-shaped conduit (e.g., pipe) connection or another type of splitter. A first portion of the purified anode exhaust is provided from the purified anode exhaust conduit 308F into a mixer conduit 308G through the second splitter 610. The purified anode exhaust is then provided from mixer conduit 308G into the mixer 210 where it is mixed with the fuel inlet stream, as described above with respect to FIG. 1A.

A second portion of the purified anode exhaust is provided from the purified anode exhaust conduit 308F into conduit 544 through the second splitter 610. A valve 546 may be located on the conduit 544 to control the amount of purified anode exhaust flowing through the conduit 544. The valve 546 may be a computer controlled valve which is controlled by the system controller 225. The purified anode exhaust is provided from conduit 544 into the injector 540 which is described in more detail below with respect to FIGS. 8A and 8B. The process then proceeds the same as described above with respect to FIG. 1A.

Figure 1C:
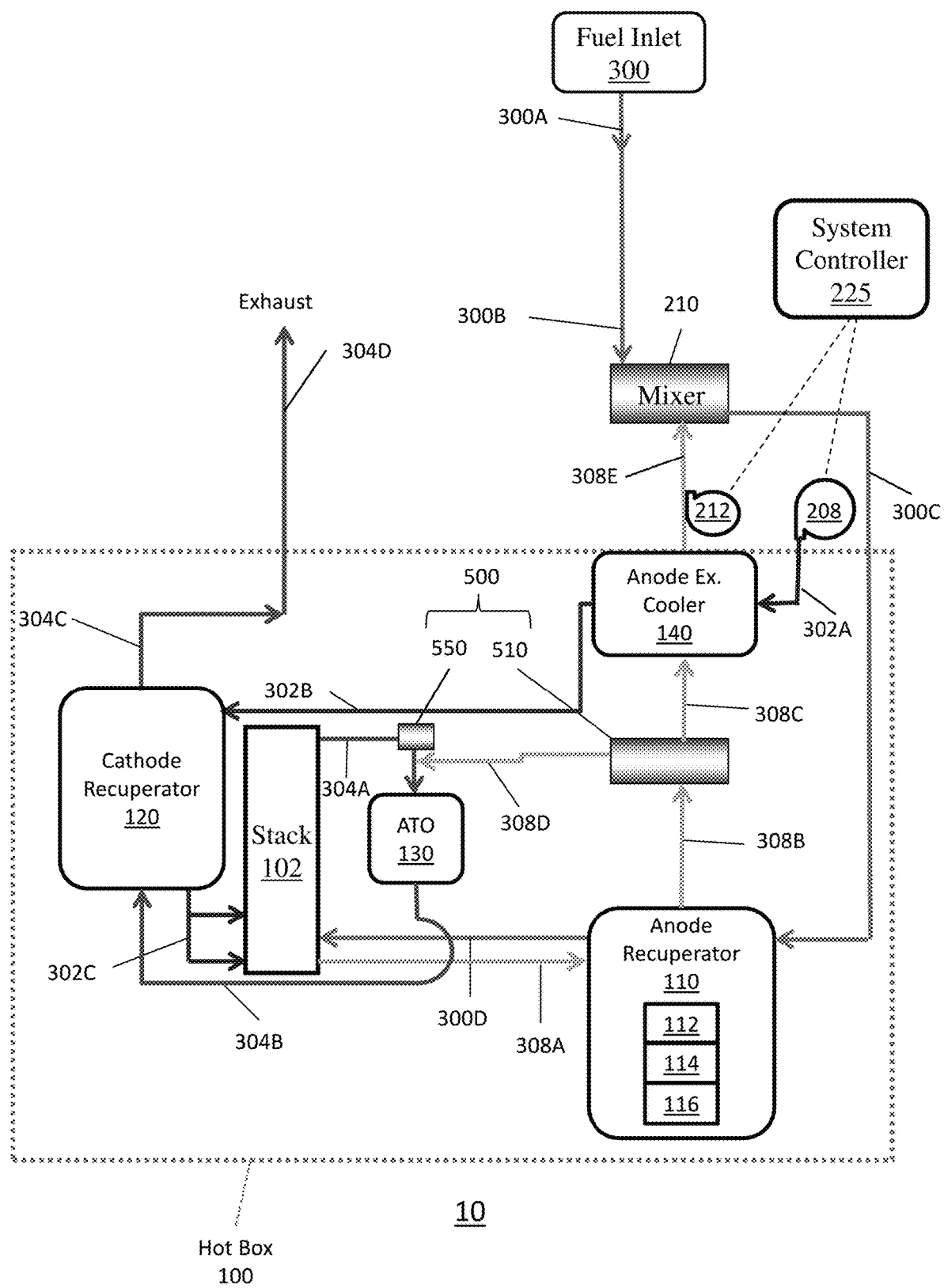

FIG. 1C is a schematic representation of a solid oxide fuel cell (SOFC) system 10 according to another embodiment of the present disclosure. The elements of system 10 of FIG. 1C that are the same as those of system 10 of FIG. 1A will not be described again for brevity.

The system 10 of FIG. 1C may be used with a pure hydrogen fuel rather than with a hydrocarbon fuel. In this embodiment, the water source 206, the steam generator 160, the CPOx reactor 200, the CPOx blower 204 and conduit 306B may be eliminated. Alternatively, the CPOx blower 204 may be retained for adding a small amount of air to the anode side of the fuel cell for a short period to lower the open circuit voltage for the purpose of closing the contactors of the power conditioning system, thus enabling current to flow to the power conditioning system components. Alternatively, water may be injected into conduit 308E and/or conduit 308C to lower the open circuit voltage for the purpose of closing the contactors. In this embodiment, conduits 300A and 300B are merged into a single conduit. Likewise, conduits 304C and 304D are merged into a single conduit. The system 10 of FIG. 1C operates the same as the system 10 of FIG. 1A, except that the hydrogen fuel inlet stream from the fuel inlet 300 is not passed through a CPOx reactor 200 and is not intentionally humidified, due to the elimination of the steam generator 160 and conduit 306B.

Figure 1D:
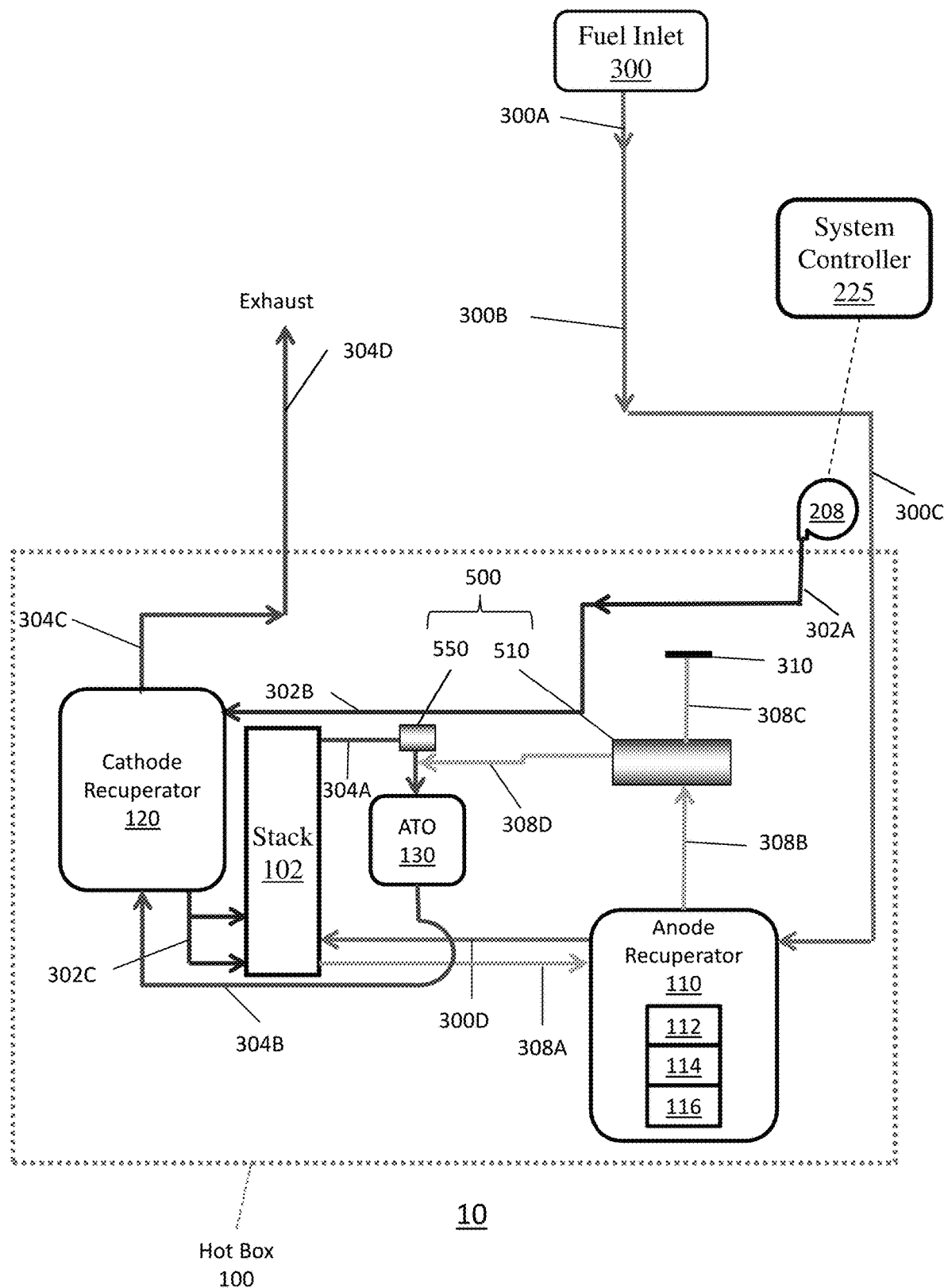

FIG. 1D is a schematic representation of a solid oxide fuel cell (SOFC) system 10 according to another embodiment of the present disclosure. The elements of system 10 of FIG. 1D that are the same as those of system 10 of FIG. 1C will not be described again for brevity.

The system 10 of FIG. 1D may be used with a pure hydrogen fuel rather than with a hydrocarbon fuel. In this embodiment, the anode exhaust cooler 140, the anode recycle blower 212, the mixer 210 and conduit 308E may be eliminated. In this embodiment, conduits 300A, 300B and 300C are merged into a single conduit. Furthermore, the anode exhaust conduit 308C may be eliminated or may dead end in a cap 310, as will be described in more detail below with respect to FIGS. 7 and 9A.

The system 10 of FIG. 1D operates the same as the system 10 of FIG. 1C, except that no portion of the anode exhaust stream is recycled into the fuel inlet stream due to elimination of the mixer 210. Instead, all (i.e., 100%) of the anode exhaust stream is provided from the anode recuperator 110 into the ATO 130 via conduits 308B, 308D and splitter (e.g., splitter 510). Furthermore, the anode exhaust stream does not exchange heat with the air inlet stream due to elimination of the anode exhaust cooler 140.

Figures 2A, 2B:
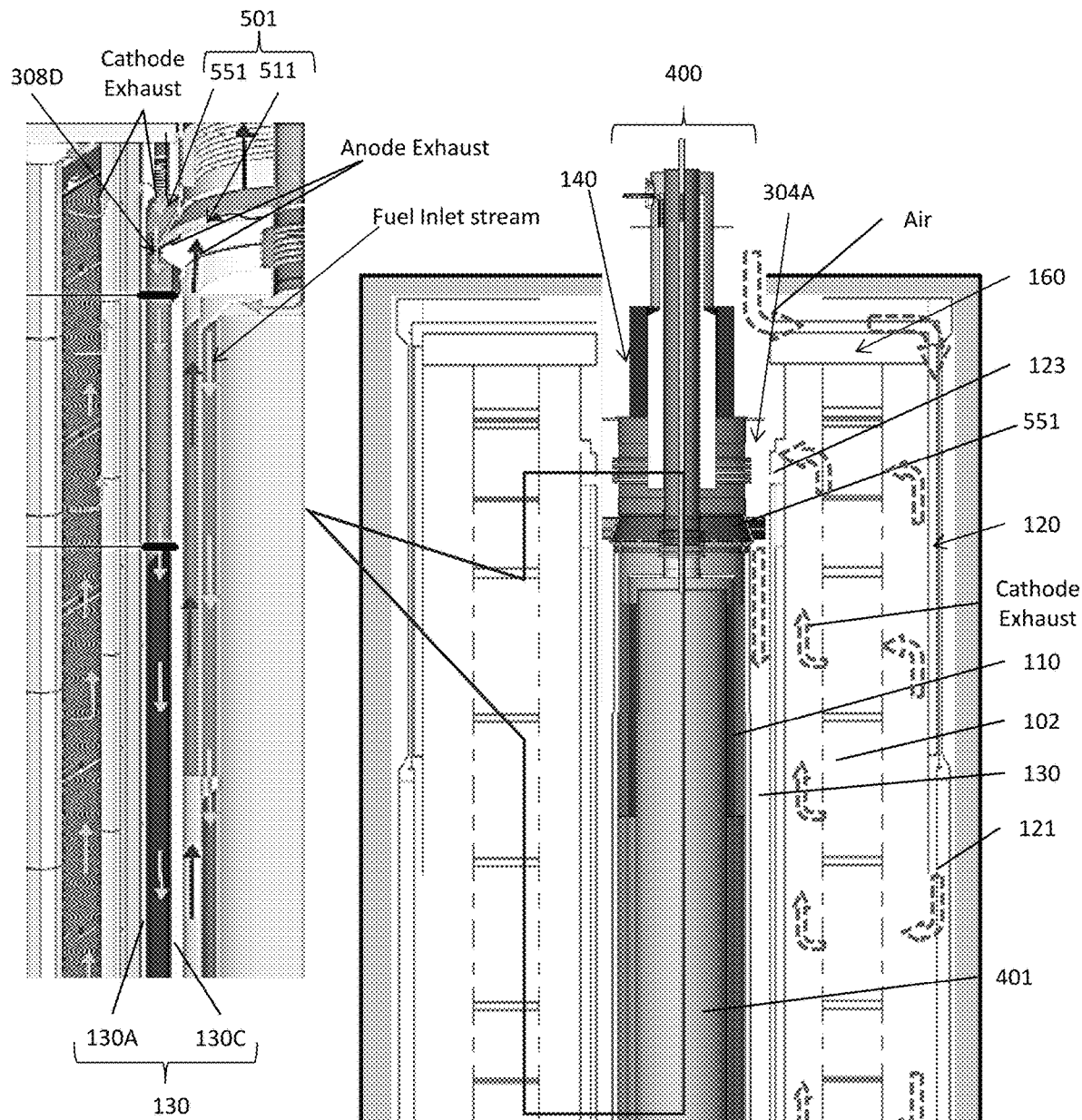
FIG. 2A is a sectional view showing components of the hot box of the system of FIG. 1A.
FIG. 2B shows an enlarged portion of FIG. 2A.
Figure 2C:
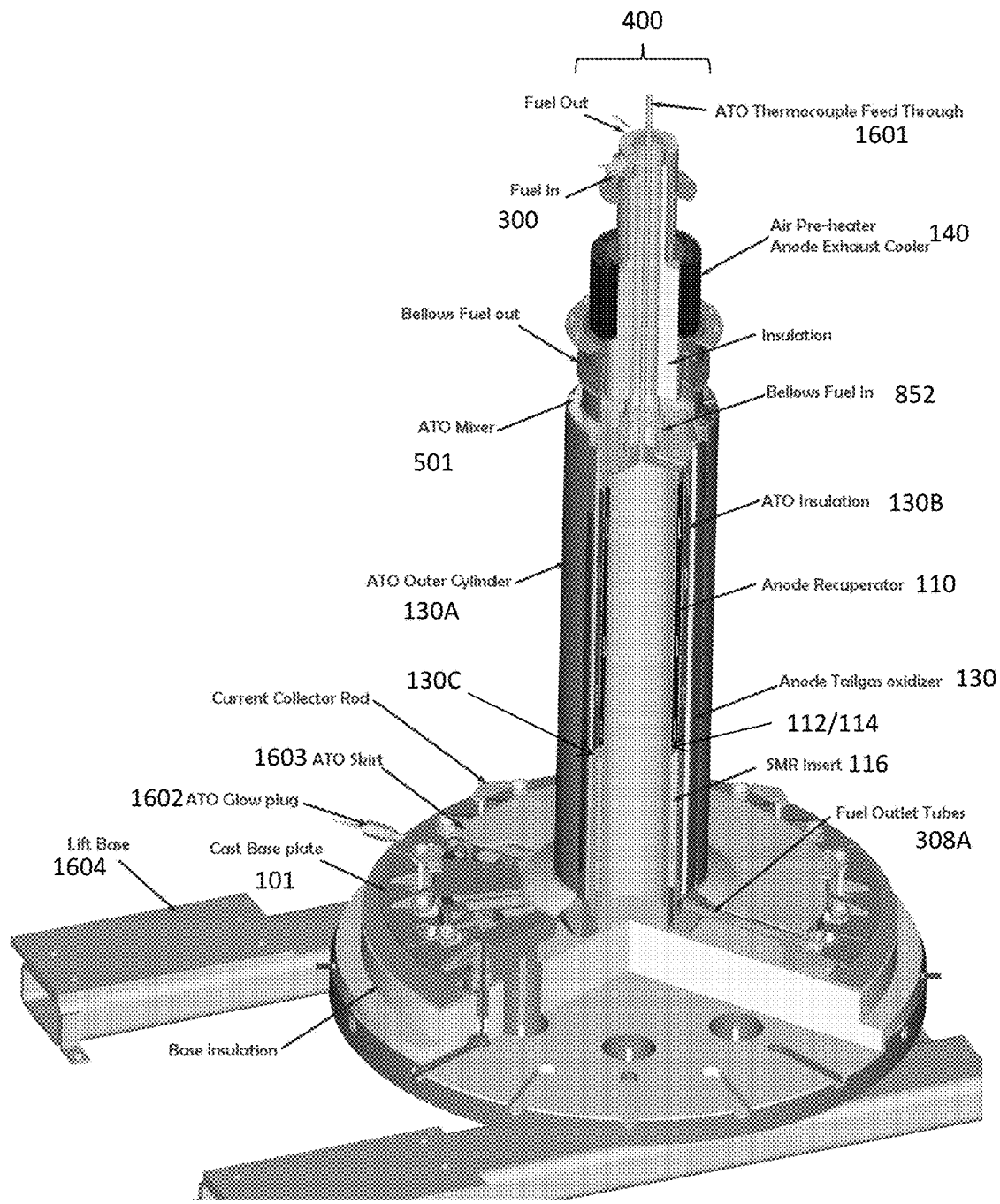
FIG. 2C is a three dimensional cut-away view of a central column of the system of FIG. 2A.
Figure 2D:
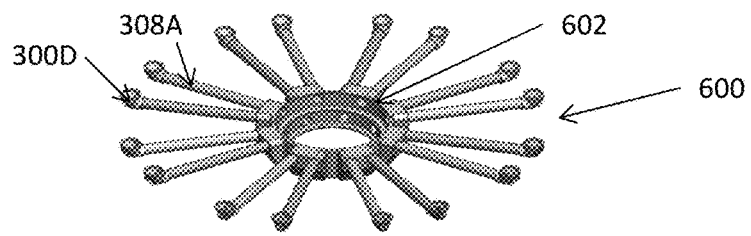
FIG. 2D is a perspective view of an anode hub structure disposed below the central column of FIG. 2A, according to various embodiments of the present disclosure.
Figure 3A:
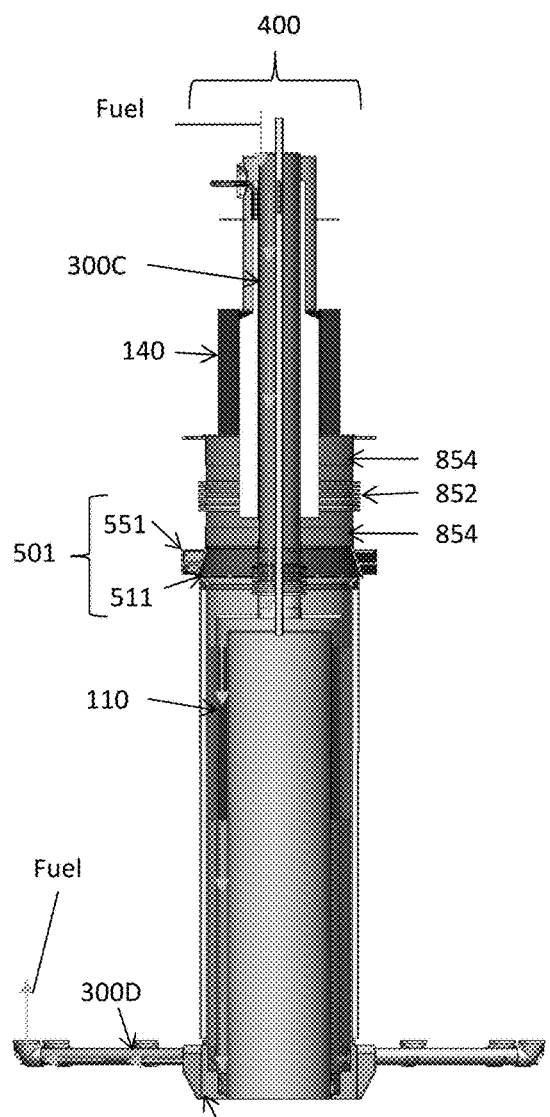
FIGS. 3A-3C are sectional views showing fuel and air flow through the central column of FIG. 2A, according to various embodiments of the present disclosure.
Figure 3B:
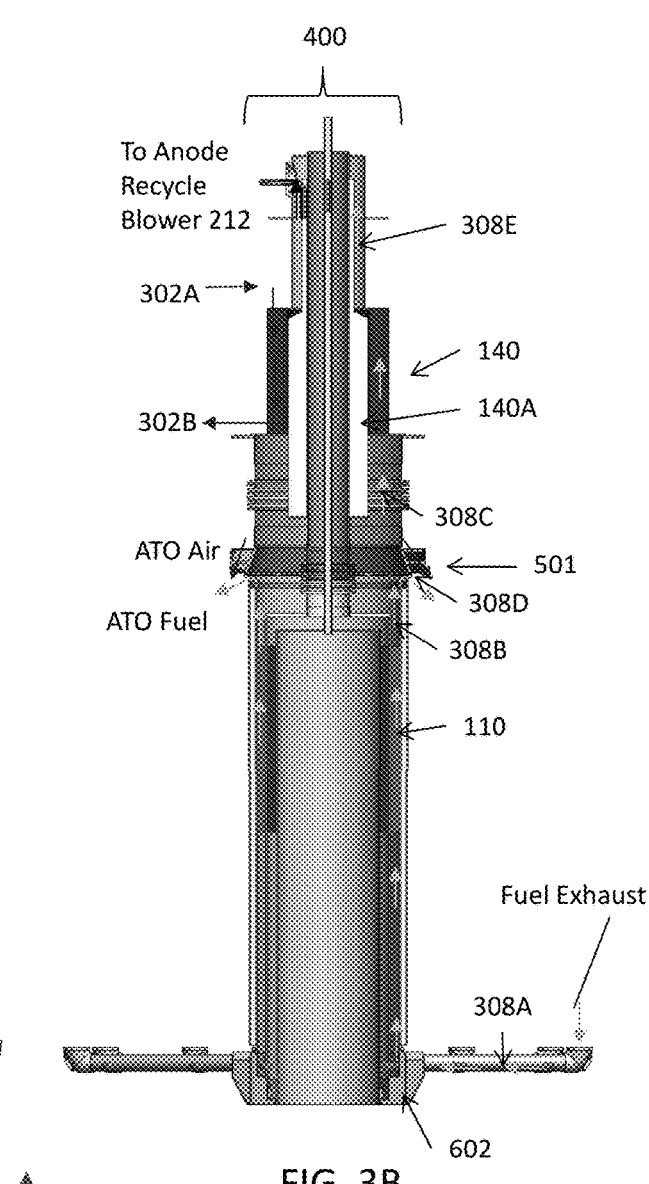
Figure 3C:
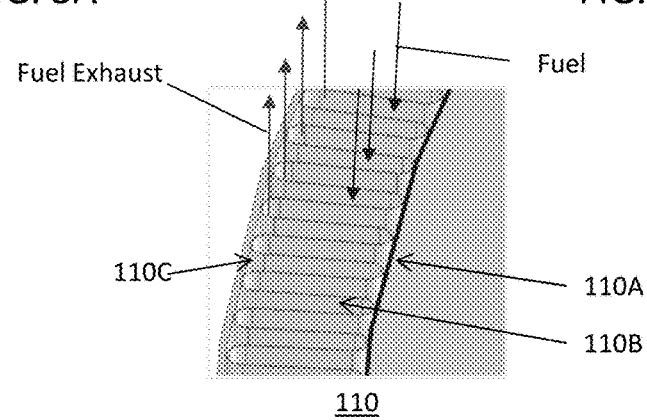
Figure 4:
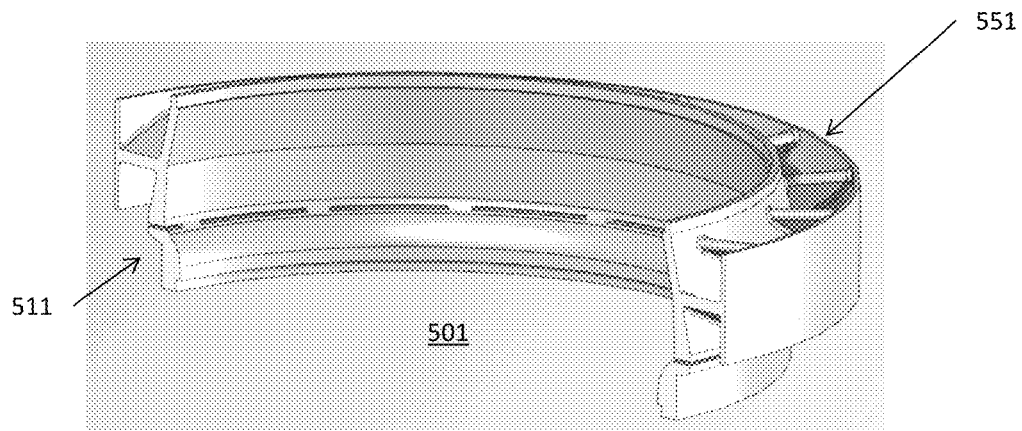
FIG. 4 is a partial perspective view of a conventional ATO injector.

FIGS. 2A-2D and 3A-3C illustrate components of the hot box 100 of the system 10 of FIGS. 1A-1D, except that a prior art ATO injector 501 including a prior art splitter 511 and a vortex generator 551 of FIG. 4 are shown in FIGS. 2A, 2B, 2C, 3A and 3B instead of the ATO injector 500 including a splitter 510 and a vortex generator 550 of embodiments of the present disclosure described above with respect to FIGS. 1A-1D and which will be described in more detail below with respect to FIGS. 5 to 9H. FIG. 2A is a sectional view showing components of the hot box 100 of the system 10 of FIG. 1A, and FIG. 2B shows an enlarged portion of FIG. 2A. FIG. 2C is a three dimensional cut-away view of a central column 400 of the system 10, according to various embodiments of the present disclosure, and FIG. 2D is a perspective view of an anode hub structure 600 disposed in a hot box base 101 on which the column 400 may be disposed.

Referring to FIGS. 2A-2D, the fuel cell stacks 102 may be disposed in the hot box 100 around the column 400. For example, the stacks 102 may be disposed in a ring configuration around the central column 400 and may be positioned on the hot box base 101. The column 400 may include a central plenum 401, the anode recuperator 110, the ATO 130, and the anode exhaust cooler 140. In particular, the anode recuperator 110 is disposed radially inward of the ATO 130, and the anode exhaust cooler 140 is mounted over the anode recuperator 110 and the ATO 130. An oxidation catalyst 112 and/or the hydrogenation catalyst 114 may be located in the anode recuperator 110. A reforming catalyst 116 may also be located at the bottom of the anode recuperator 110 as a steam methane reformation (SMR) insert.

The ATO 130 comprises an outer cylinder 130A that is positioned around inner ATO insulation 130B/outer wall of the anode recuperator 110. Optionally, the insulation 130B may be enclosed by an inner ATO cylinder 130C. Thus, the insulation 130B may be located between the anode recuperator 110 and the ATO 130. An ATO oxidation catalyst may be located in the space between the outer cylinder 130A and the ATO insulation 130B. An ATO thermocouple feed through 1601 extends through the anode exhaust cooler 140, to the top of the ATO 130. The temperature of the ATO 130 may thereby be monitored by inserting one or more thermocouples (not shown) through this feed through 1601.

The anode hub structure 600 may be positioned under the anode recuperator 110 and ATO 130 and over the hot box base 101. The anode hub structure 600 is covered by an ATO skirt 1603. The ATO injector 501 including the vortex generator 551 and anode exhaust splitter 511 is located over the anode recuperator 110 and ATO 130 and below the anode cooler 140. An ATO glow plug 1602, which initiates the oxidation of the stack anode exhaust in the ATO during startup, may be located near the bottom of the ATO 130.

The anode hub structure 600 is used to distribute fuel evenly from a central plenum to fuel cell stacks disposed around the central column 400. The anode flow hub structure 600 includes a grooved cast base 602 and a "spider" hub of fuel inlet conduits 300D and outlet conduits 308A. Each pair of conduits 300D, 308A connects to a fuel cell stack. Anode side cylinders (e.g., anode recuperator 110 inner and outer cylinders and ATO outer cylinder 130A) are then welded or brazed into the grooves in the base 602, creating a uniform volume cross section for flow distribution as discussed below.

As illustrated in FIG. 2C, a lift base 1604 located under the hot box base 101. In an embodiment, the lift base 1604 includes two hollow arms with which the forks of a fork lift can be inserted to lift and move the fuel cell unit, such as to remove the fuel cell unit from a cabinet (not shown) for repair or servicing.

As shown by the arrows in FIGS. 2A and 2B, air enters the top of the hot box 100 and then flows into the cathode recuperator 120 where it is heated by cathode exhaust from the stacks 102. The heated air then flows inside the cathode recuperator 120 through an inlet 121. The air then flows through the stacks 102 and reacts with fuel provided from the anode hub structure 600. Cathode exhaust flows from the stacks 102, through an outlet 123. The air exhaust then passes through the vanes of the vortex generator 551 and is swirled before entering the ATO 130.

The splitter 511 may direct a portion of the anode exhaust exiting the top of the anode recuperator 110 into the swirled air exhaust. The anode exhaust and the cathode exhaust may be mixed in the ATO injector 501 before entering the ATO 130.

FIGS. 3A and 3B are side cross-sectional views showing flow distribution through the central column 400, and 3C is top cross-sectional view taken through the anode recuperator 110. Referring to FIGS. 2A, 2B, 3A, and 3C, the anode recuperator 110 includes an inner cylinder 110A, a corrugated plate 110B, and an outer cylinder 110C that may be coated with the ATO insulation 130B. Fuel from fuel conduit 300C enters the top of the central column 400. The fuel then bypasses the anode cooler 140 by flowing through its hollow core and then flows through the anode recuperator 110, between the outer cylinder 110C and the and the corrugated plate 110B. The fuel then flows through the hub base 602 and conduits 300D of the anode hub structure 600 (FIG. 3B), to the stacks 102.

Referring to FIGS. 2A, 2B, 3A and 3B, anode exhaust flows from the stacks 102 through conduits 308A into the hub base 602, and from the hub base 602 through the anode recuperator 110, between in inner cylinder 110A and the corrugated plate 110B, and through conduit 308B into the splitter 511. A portion of the anode exhaust flows from the splitter 511 to the anode cooler 140 through conduit 308C, while another portion flows from the splitter 511 to the ATO 130 through conduit 308D (see FIG. 1A). Conduit 308C may be at least partially defined by a bellows 852 and a supporting cylinder 854 located between the anode cooler 140 and the vortex generator 551, as shown in FIGS. 3A and 3C. Anode cooler inner core insulation 140A may be located between the fuel conduit 300C and conduit 308C. This insulation minimizes heat transfer and loss from the anode exhaust stream in conduit 308C on the way to the anode cooler 140. Insulation 140A may also be located between conduit 300C and the anode cooler 140 to avoid heat transfer between the fuel inlet stream in conduit 300C and the streams in the anode cooler 140. The bellows 852 and supporting cylinder 854 may be disposed between the anode cooler 140 and the splitter 511.

FIG. 3B also shows air flowing from the air conduit 302A to the anode cooler 140 (where it exchanges heat with the anode exhaust stream), into conduit 302B to the cathode recuperator 120. As shown in FIGS. 2A and 3B, the anode exhaust exits the anode recuperator 110 and is provided into splitter 511 through conduit 308B. The splitter 511 splits the anode exhaust into first and second anode exhaust streams. The first stream is provided to the ATO 130 through conduit 308D. The second stream is provided into the anode cooler 140 through conduit 308C.

The relative amounts of anode exhaust provided to the ATO 130 and the anode exhaust cooler 140 is controlled by the anode recycle blower 212. The higher the blower 212 speed, the larger portion of the anode exhaust stream is provided into conduit 308C and a smaller portion of the anode exhaust stream is provided to the ATO 130, and vice-versa. The anode exhaust stream provided to the ATO 130 may be oxidized by the cathode exhaust and provided to the cathode recuperator 120 through conduit 304B.

FIG. 4 is a partial perspective view of a conventional ATO injector 501 comprising an integrated splitter 511 and vortex generator 551. The conventional ATO injector 501 is formed by casting a metallic material, such as steel, such that the splitter 511 and the vortex generator 551 are integrated in a single part. Accordingly, the cast ATO injector 501 is expensive and time consuming to manufacture.

Figure 5:
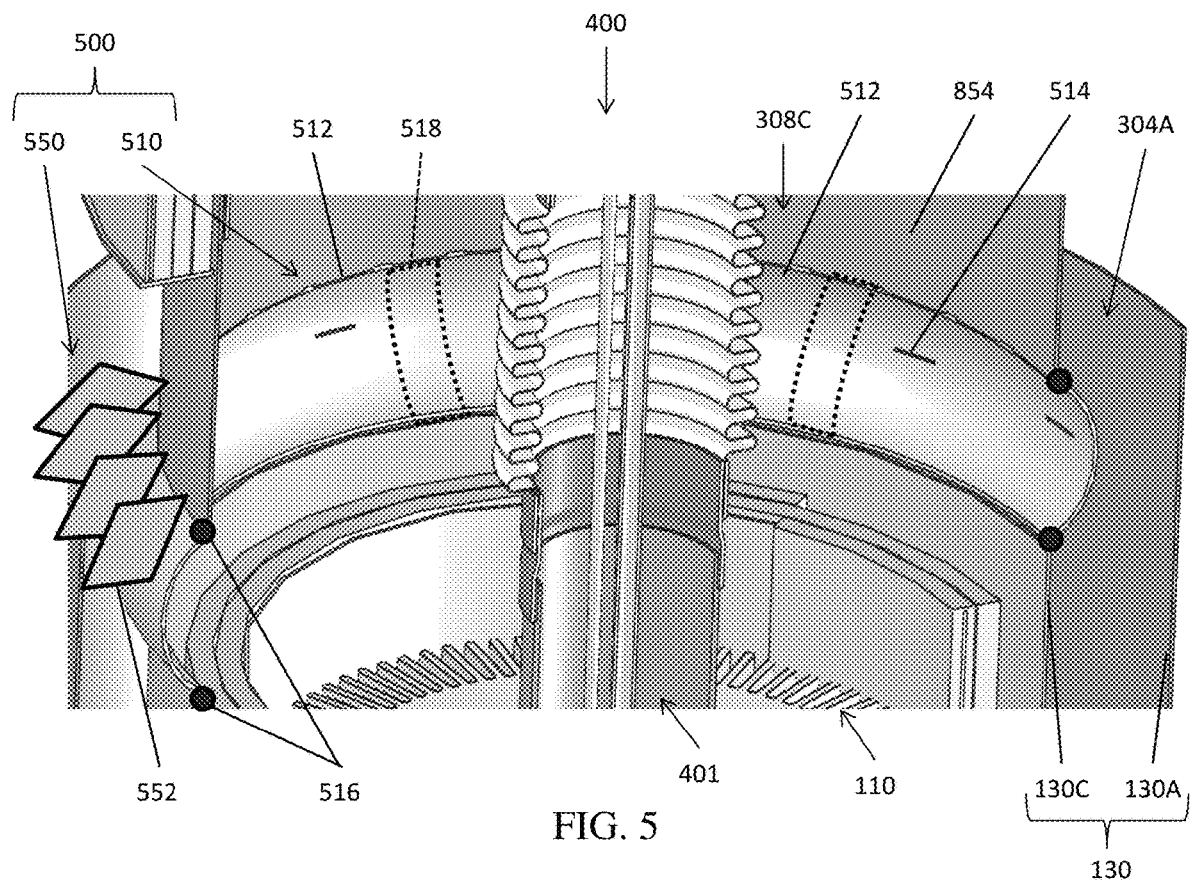
FIG. 5 is a partial perspective view of the ATO injector included in a central column of FIG. 2A, according to an embodiment of the present disclosure.

FIG. 5 is a partial perspective view of the ATO injector 500 of one embodiment of the present disclosure which is provided in the central column 400 of FIGS. 2A, 2C, 3A and 3B in place of the prior art ATO injector 501. Referring to FIG. 5, the ATO injector 500 includes the splitter 510 and the vortex generator 550. The splitter 510 may include an arcuate body 512 having an annular shape. The annular shape may have a radius of curvature about a circular axis located in a horizontal plane (as opposed to a radius of curvature about a vertical axis of the conventional ATO injector 501 shown in FIG. 4). In some embodiments, the splitter 510 may be formed by cutting a metallic tube to form an arc, bending the arc into an annular shape, and the connecting opposing ends thereof. In other embodiments, multiple arcs may be cut, bent, and connected end to end to form the arcuate body 512 of the splitter 510. The outer surface of arcuate body 512 (i.e., the surface facing away from a central axis of the central column 400) may be convex, such that the minimum distance between the outer surface of the arcuate body 512 and the outer cylinder 130A of the ATO 130 is less than the minimum distance between the inner cylinder 130C and the outer cylinder 130A of the ATO 130.

In various embodiments, the arcuate body 512 may having an arc measure (taken along the outer surface of the arcuate body 512) of about 180° or less, such as from about 180° to about 130°, from about 175° to about 150°, or from about 170° to about 160°. Accordingly, the protrusion of the splitter 510 into the ATO 130 may be controlled to minimize the disruption to the flow of the cathode exhaust, thereby reducing and/or eliminating the creation of recirculation zones and minimizing pressure drop therein.

In some embodiments, the splitter 510 may optionally include support arcs 518 configured to strengthen the arcuate body 512. In particular, the support arcs 518 may be formed from uncut portions of a pipe used to form the arcuate body 512. For example, from about 10% to about 30%, such as about 20% of the length of a pipe used to form the arcuate body 512 may remain uncut to form the support arcs 518. In other words, the arc measure of the support arcs 518 plus the arc measure of the arcuate body 512 may equal 360°.

An upper edge of the arcuate body 512 may be attached to the supporting cylinder 854, and a lower edge of the arcuate body 512 may be attached to the inner ATO cylinder 130C of the ATO 130. For example, the arcuate body 512 may be welded to portions of the inner ATO cylinder 130C. In some embodiments, the arcuate body 512 may be connected to the supporting cylinder 854 and the inner ATO cylinder 130C using filet welds 516.

The splitter 510 may include injection apertures 514 that perforate the arcuate body 512 and are configured to inject anode exhaust into the cathode exhaust flowing into the ATO 130 from the cathode exhaust conduit 304A. The injection apertures 514 may be substantially evenly spaced along the splitter 510. In some embodiments, the injections apertures 514 may be cut using a laser or a water jet, for example. The injection apertures 514 may be slant-cut, such that the perimeter of each aperture 514 is larger on the inner surface of the arcuate body 512 than on the outer surface thereof. The apertures 514 may inject the anode exhaust flow perpendicular to the axis (i.e., central vertical axis) of the inner ATO cylinder 130 or may inject the anode exhaust flow with a downward angle (e.g., an angle of 1 to 89 degrees, such as 30 to 60 degrees) into the direction of the cathode exhaust flow into the ATO 130.

The vortex generator 550 may include a number of vanes 552 attached to the outer surface of the splitter 510, such as by welding or the like. Although not shown in FIG. 5, the vanes 552 may be arranged in an annular configuration around the splitter 510. The vanes 552 may be configured to swirl (e.g., generate a vortex in) fluids flowing thereby, such as anode and/or cathode exhaust. Accordingly, the vanes 552 may be configured to increase mixing of the anode exhaust and the cathode exhaust. In other embodiments, the vanes 552 may be attached to an outer surface of the inner cylinder 130C or the supporting cylinder 854.

Figure 6:
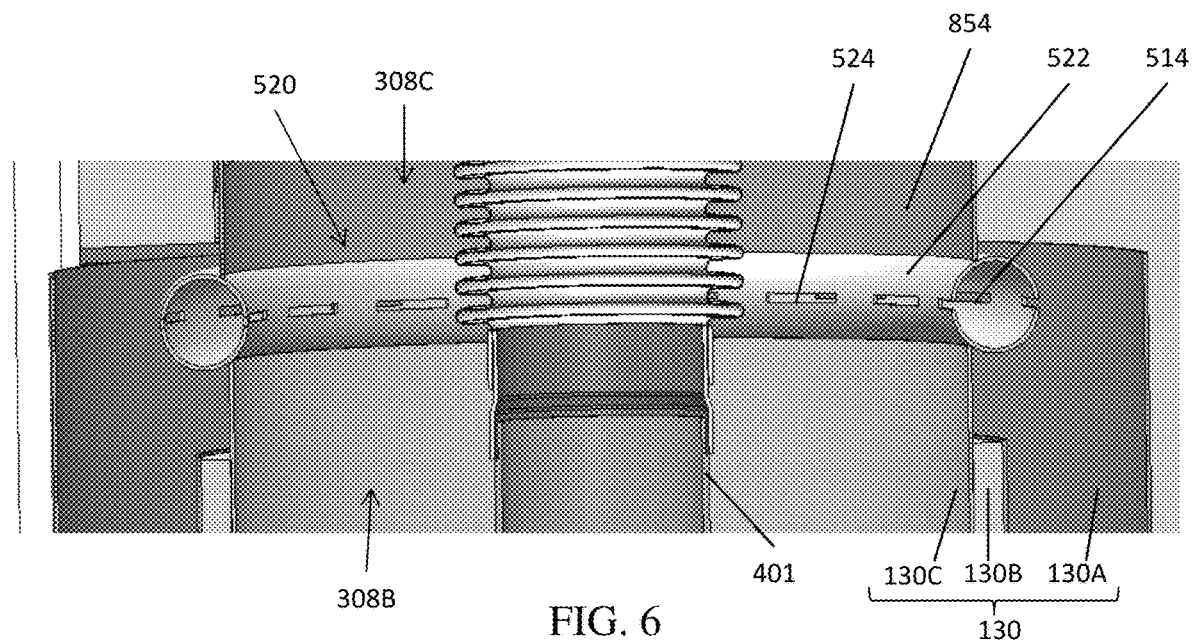
FIGS. 6, 7, 8A, 8B and 9A are partial perspective views of alternative injectors that may be included in the ATO injector of FIG. 5, according to alternative embodiments of the present disclosure.
Figure 7:
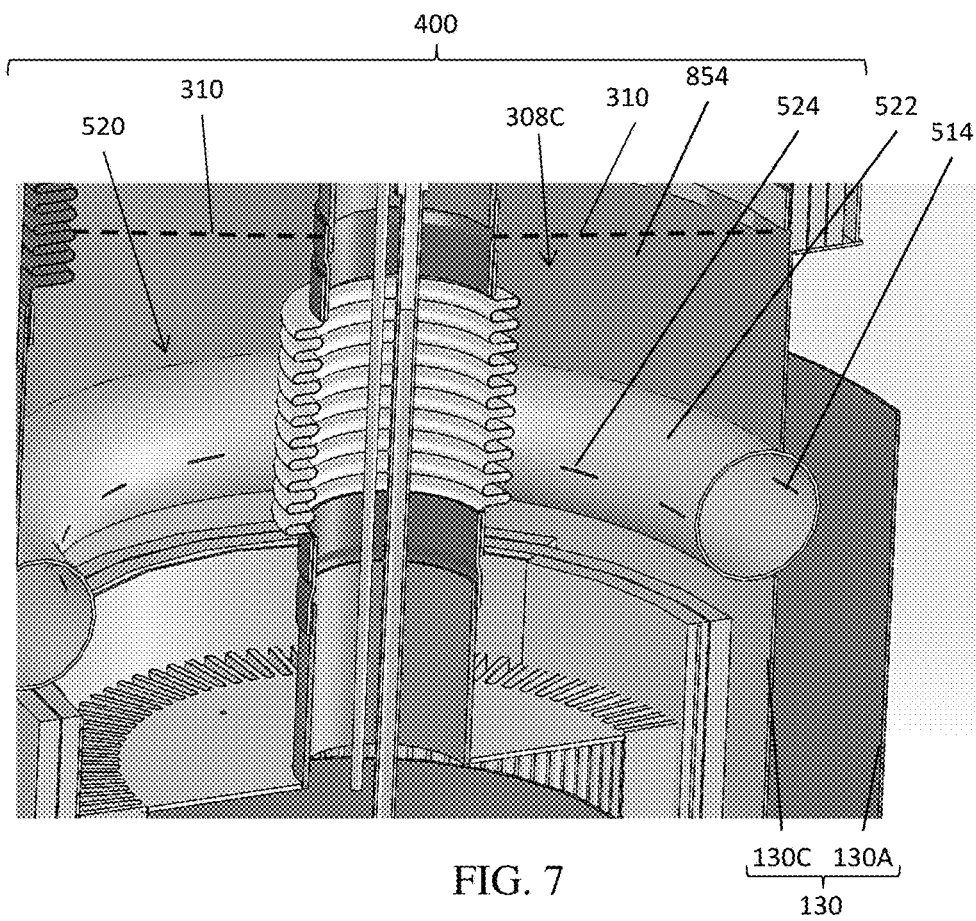

FIGS. 6 and 7 are partial perspective views at a different viewing angle of the central column 400 including an alternative splitter 520 that may be included in the ATO injector 500 of FIG. 5 instead of the splitter 510, according to an alternative embodiment of the present disclosure. Referring to FIGS. 6 and 7, the splitter 520 may be a toroidal conduit (e.g., tubular body, such as a pipe) 522. In some embodiments, the splitter 520 may be formed by bending a pipe 522 into a circle and connecting opposing ends thereof, by welding or the like. Thus, in this embodiment, the splitter 520 has an arc measure of 360 degrees around its entire circumference. The vertical central axis of the toroidal conduit is parallel to the vertical central axis of the central column 400. Furthermore, the outer convex surface of the toroidal conduit curves around a horizontal axis which is perpendicular to the vertical central axis.

The splitter 520 may include inner injection apertures 524 configured to inject anode exhaust into inside of the splitter 520, and outer injection apertures 514 configured to inject anode exhaust from inside the splitter 520 into the ATO 130. The injection apertures 514, 524 may be substantially evenly spaced along the respective inner and outer portions the splitter 520 and may be cut using a laser or a water jet, for example.

In some embodiments the injection apertures 514, 524 may be substantially the same size. However, in other embodiments, the inner injection apertures 524 may be larger (e.g., larger height) than the outer injection apertures 514, in order to facilitate injection of anode exhaust into the splitter 520. In some embodiments, the inner injection apertures 524 and/or the outer injection apertures 514 may be slant-cut, as described above.

In one embodiment shown in FIGS. 1D and 7, the conduit 308C may be capped with a cap 310. The cap 310 may comprise a solid metal plate which blocks gases from passing through conduit 308C is operated on hydrogen fuel.

Figure 8A:
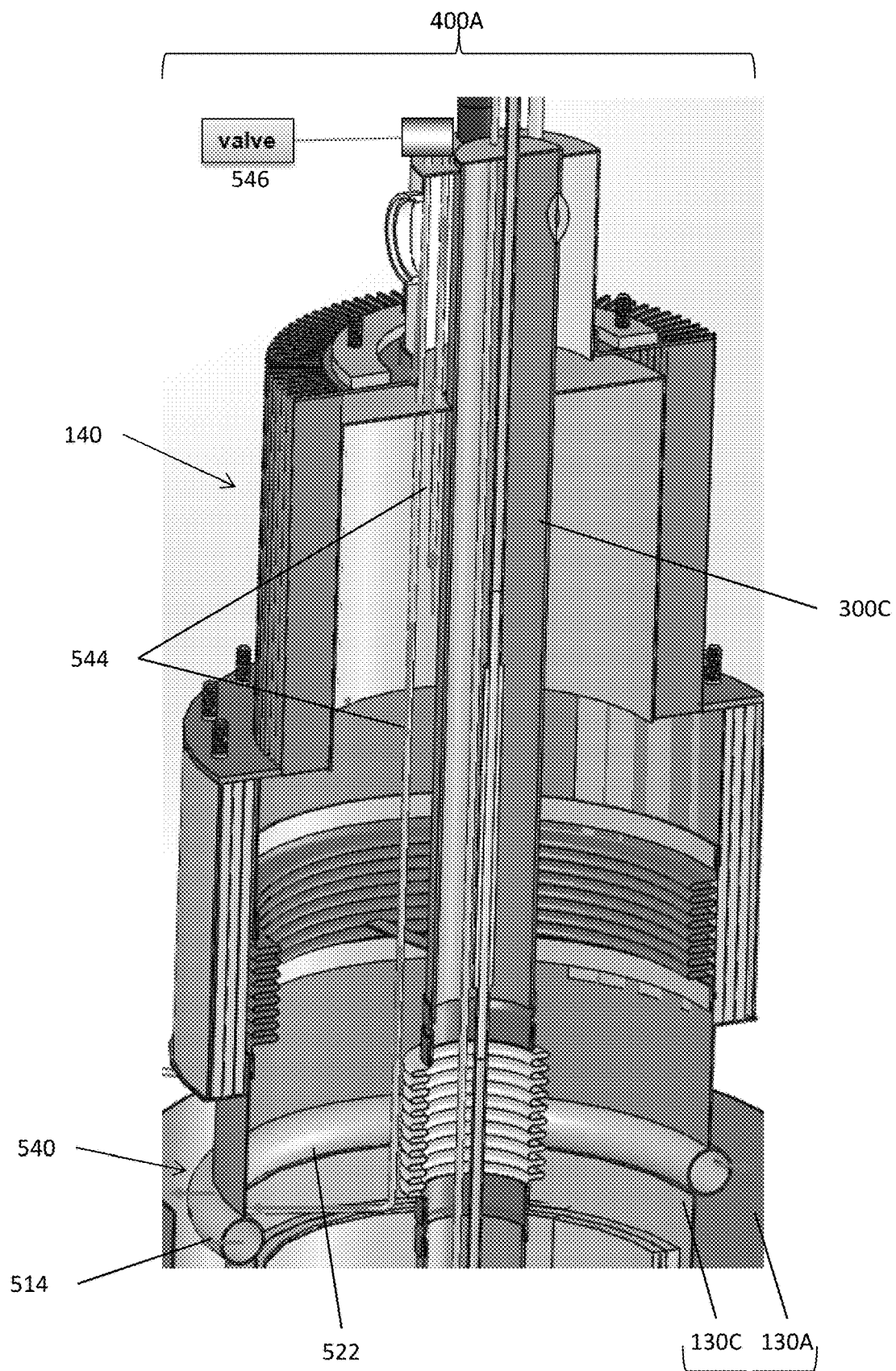

FIG. 8A is a partial perspective view of the central column 400A including an alternative injector 540 that may be included in the ATO injector 500 of FIG. 5 instead of the splitter 510, according to another alternative embodiment of the present disclosure. Referring to FIG. 8A, the injector 540 may comprise a toroidal conduit. In some embodiments, the injector 540 may be formed by bending a pipe into a circle and connecting opposing ends thereof, by welding or the like.

The injector 540 may include injection apertures 514 disposed on the outer surface thereof and that perforate the injector 540. The injection apertures 514 may be configured to inject anode exhaust from inside the injector 540 into the ATO 130. No apertures are disposed on the inner surface of the toroidal conduit 522 of the injector 540.

At least one conduit (e.g., supply tube) 544 may be disposed inside the central column 400A and fluidly connected to the injector 540. A valve 546 is disposed on the supply tube 544. The supply tube 544 may extend along fuel conduit 300C. The supply tube 544 may have an open first end exposed in the conduit (e.g., manifold) 308C and configured to receive anode exhaust from inside the anode exhaust cooler 140 via conduit 308C, and a second end fluidly connected to the toroidal (e.g., tubular) conduit 522. Accordingly, the supply tube 544 may be configured to supply anode exhaust to the inside of the injector 540.

The valve 546 may be configured to control anode exhaust flow through the supply tube 544 and into the injector 540. As such, the valve 546 may also control anode exhaust flow through the injection apertures 514 and into the ATO 130. The valve 546 may be disposed on a portion of the supply tube 544 that is exposed on the surface of the portion of the central column 400A that extends outside the hotbox 100. Accordingly, the valve 546 may be protected from exposure to high temperatures inside the hotbox. One purpose of the valve 546 is to separate the anode and cathode exhaust streams which is useful for leak checking of joints and/or welds during the system assembly process. Another purpose is to optionally have a fuel feed separate from the anode exhaust stream. While only one supply tube 544 and one valve 546 are shown in FIG. 8A, in an alternative embodiment, there may be plural tubes, such as plural inlet and/or outlet tubes 544 that are manifolded together for a single valve 546 or multiple valves 546. For example, two supply tubes 544 may be connected to opposite sides of the toroidal body 522.

Figure 8B:
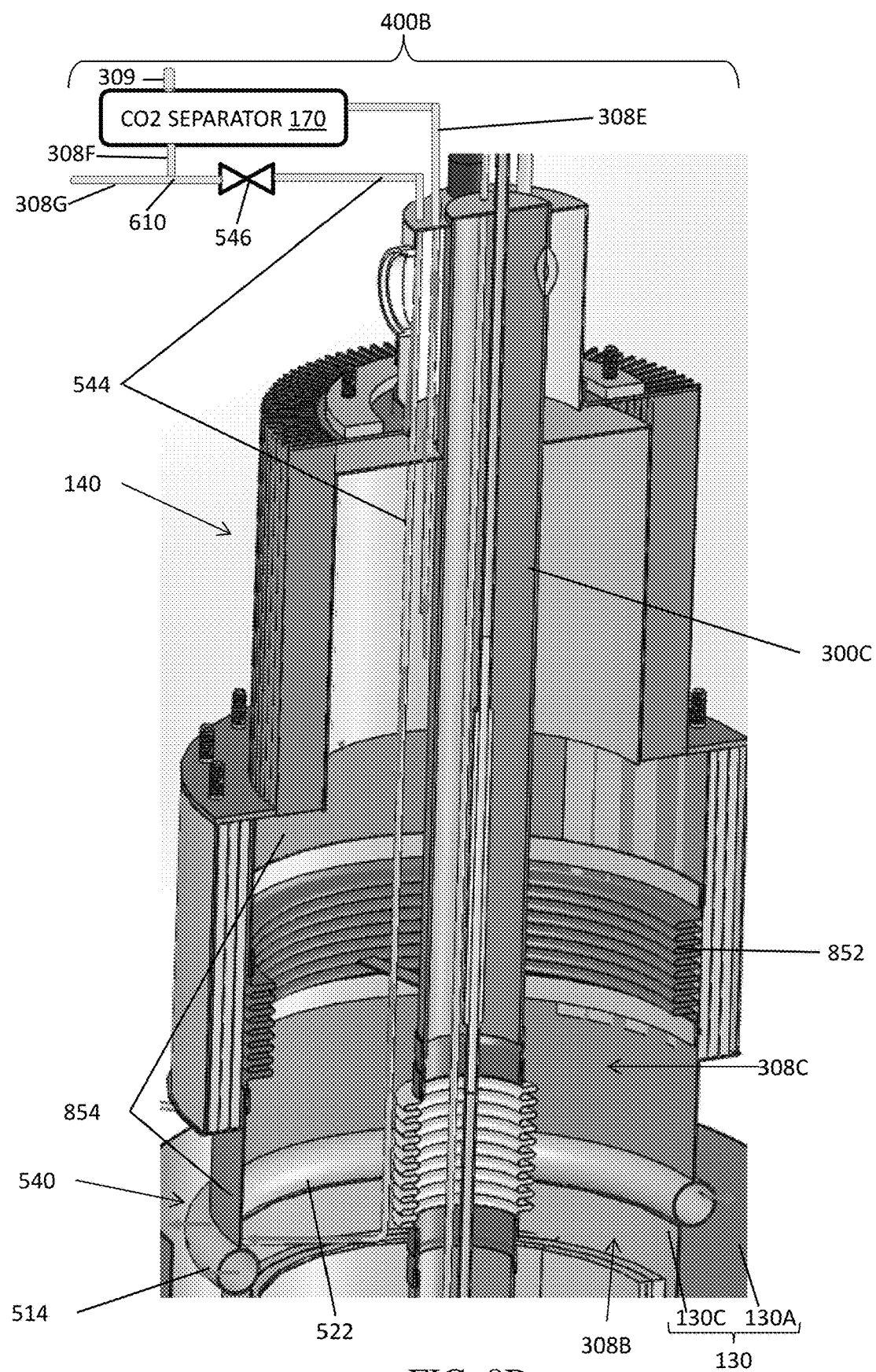

FIG. 8B is a partial perspective view of an alternative embodiment of the central column 400B. The elements of the central column 400B of FIG. 8B that are the same as those of the central column 400A of FIG. 8A will not be described again for brevity. The central column 400B of FIG. 8B may be used with the solid oxide fuel cell (SOFC) system 10 of FIG. 1B.

As discussed above with respect to FIG. 1B above, the anode exhaust conduit (308B, 308C, 308E) bypasses and is not directly fluidly connected to the injector 540 because the inner surface of the toroidal conduit 522 of the injector 540 does not have any openings (e.g., apertures) exposed to the anode exhaust conduit (e.g., to conduits 308B and 308C). Conduits 308B and 308C which comprise the lower portion of the anode exhaust conduit which includes the inner plenum or manifold located between the outer wall of the fuel conduit 300C and the inner walls of the ATO inner cylinder 130C and the supporting cylinder 854. The upper portion of the anode exhaust conduit comprises conduit 308E extending between the anode exhaust cooler 140 and the carbon dioxide separator 170. Therefore, the entire (i.e., 100% of) anode exhaust stream is provided from the anode recuperator 110 into the anode exhaust cooler 140 via conduits 308B and 308C without following through the injector 540. The anode exhaust exchanges heat with the air inlet stream in the anode exhaust cooler. The anode exhaust is provided from the anode exhaust cooler 140 into the anode exhaust inlet of the carbon dioxide separator 170 through conduit (e.g., pipe) 308E. The carbon dioxide is separated from the anode exhaust in the carbon dioxide separator 170. The separated carbon dioxide is removed from the carbon dioxide separator 170 via conduit 309 for storage or industrial use (e.g., in chemical or industrial processes) outside the system 10. The purified anode exhaust from which all or a portion of carbon dioxide is removed is provided from the carbon dioxide separator 170 into the purified anode exhaust conduit 308F.

In one embodiment, the purified anode exhaust conduit 308F terminates in the second splitter 610 which may be a T-shaped conduit (e.g., pipe) connection at the intersection of conduits 308F, 308G and 544. A first portion of the purified anode exhaust is provided from the purified anode exhaust conduit 308F into the mixer conduit 308G through the second splitter 610. The purified anode exhaust is then provided from the mixer conduit 308G into the mixer 210 where it is mixed with the fuel inlet stream, as described above with respect to FIGS. 1A and 1B.

A second portion of the purified anode exhaust is provided from the purified anode exhaust conduit 308F into conduit 544 through the second splitter 610. The valve 546 located on the conduit 544 controls the amount of purified anode exhaust flowing through the conduit 544 into the toroidal conduit 522 of the injector 540. The purified anode exhaust is provided from conduit 544 into the injector 540. The anode exhaust is then provided from the injector 540 into the ATO 130 via the apertures 514 in the toroidal conduit 522 of the injector 540 and via the vortex generator 550.

Thus, in the embodiments of FIGS. 5 to 8B, the fuel cell system 10 includes a fuel cell stack 102, an anode recuperator heat exchanger 110 configured to receive an anode exhaust from the fuel cell stack 102, an anode exhaust conduit 308B configured to receive the anode exhaust from the anode recuperator 110, a cathode exhaust conduit 304A configured to receive a cathode exhaust from the fuel cell stack, an anode tail gas oxidizer (ATO) 130 surrounding the anode recuperator 110 and configured to receive the cathode exhaust from the cathode exhaust conduit 304A, and an ATO injector 500 located between the ATO 130 and the anode exhaust conduit 308B. The ATO injector 500 includes vanes 552 of the vortex generator 550 configured to swirl the cathode exhaust provided from the cathode exhaust conduit, and an arcuate body 512 or 522 disposed between the anode exhaust conduit 308B and the ATO 130, and through which at least a portion of the anode exhaust is configured to flow from the anode exhaust conduit, the arcuate body comprising injection apertures 514 configured to inject a at least a portion of the anode exhaust into the swirled cathode exhaust flowing to the ATO 130.

In one embodiment shown in FIG. 5, the arcuate body 512 has an arc measure of from about 130° to about 180° taken along an outer surface of the arcuate body. In other embodiments shown in FIGS. 6-8B, the arcuate body 522 comprises a toroidal conduit having an arc measure of 360° taken along an outer surface of the toroidal conduit.

In the embodiments shown in FIGS. 6 and 7, the toroidal conduit 522 further comprises inner apertures 524 configured to direct the first portion of the anode exhaust from the anode exhaust conduit 308B into the toroidal conduit. In one embodiment, the inner apertures 524 are larger than the injection apertures 514.

In the embodiment shown in FIGS. 8A and 8B, the system 10 also includes a supply tube 544 is configured to provide the anode exhaust from the anode exhaust conduit 308B to the inside of the toroidal conduit 522, and a valve 546 configured to control the anode exhaust flow through the supply tube 544. The valve 546 may be disposed outside a hotbox 100 containing the anode recuperator heat exchanger 110, the anode exhaust conduit 308B, the ATO 130, and the ATO injector 500.

In the embodiment of FIG. 8B, a carbon dioxide separator 170 is fluidly connected to the anode exhaust conduit (308B, 308C, 308F) and to the supply tube 544, such that the carbon dioxide separator 170 is configured to separate carbon dioxide from the anode exhaust. In one embodiment, the carbon dioxide separator 170 comprises an electrochemical carbon dioxide separator.

In one embodiment, the system 10 of FIGS. 1B and 8B also includes an anode exhaust cooler heat exchanger 140 configured to heat an air inlet stream from the air blower 208 using the anode exhaust in the anode exhaust conduit, and a mixer 210 configured to mix a portion of the anode exhaust with a fuel inlet stream flowing in the fuel conduit 300C to the anode recuperator heat exchanger 110.

One embodiment, the anode exhaust conduit (308B, 308C, 308E) bypasses and is not directly fluidly connected to the toroidal conduit 522 of the injector 540. An inner surface of the toroidal conduit 522 does not have any openings exposed to the anode exhaust conduit (308B, 308C, 308E). The carbon dioxide separator 170 is located between the anode exhaust cooler heat exchanger 140 and the mixer 210 in a path of the anode exhaust. The anode exhaust conduit (e.g., portion 308E of the conduit 308B, 308C, 308E) connects an outlet of the anode exhaust cooler heat exchanger 140 to an inlet of the carbon dioxide separator 170.

In one embodiment, the system of FIGS. 1B and 8B also includes a purified anode exhaust conduit 308F connected to a first outlet of the carbon dioxide separator 170 and a carbon dioxide outlet conduit 309 connected to a second outlet of the carbon dioxide separator 170. A splitter (i.e., the second splitter) 610 is fluidly connected to the carbon dioxide outlet conduit 308F. A mixer conduit 308G fluidly connects the splitter 610 to the mixer 210, while conduit (i.e., the supply tube) 544 fluidly connects the splitter 610 to the toroidal conduit 522.

Figure 9A:
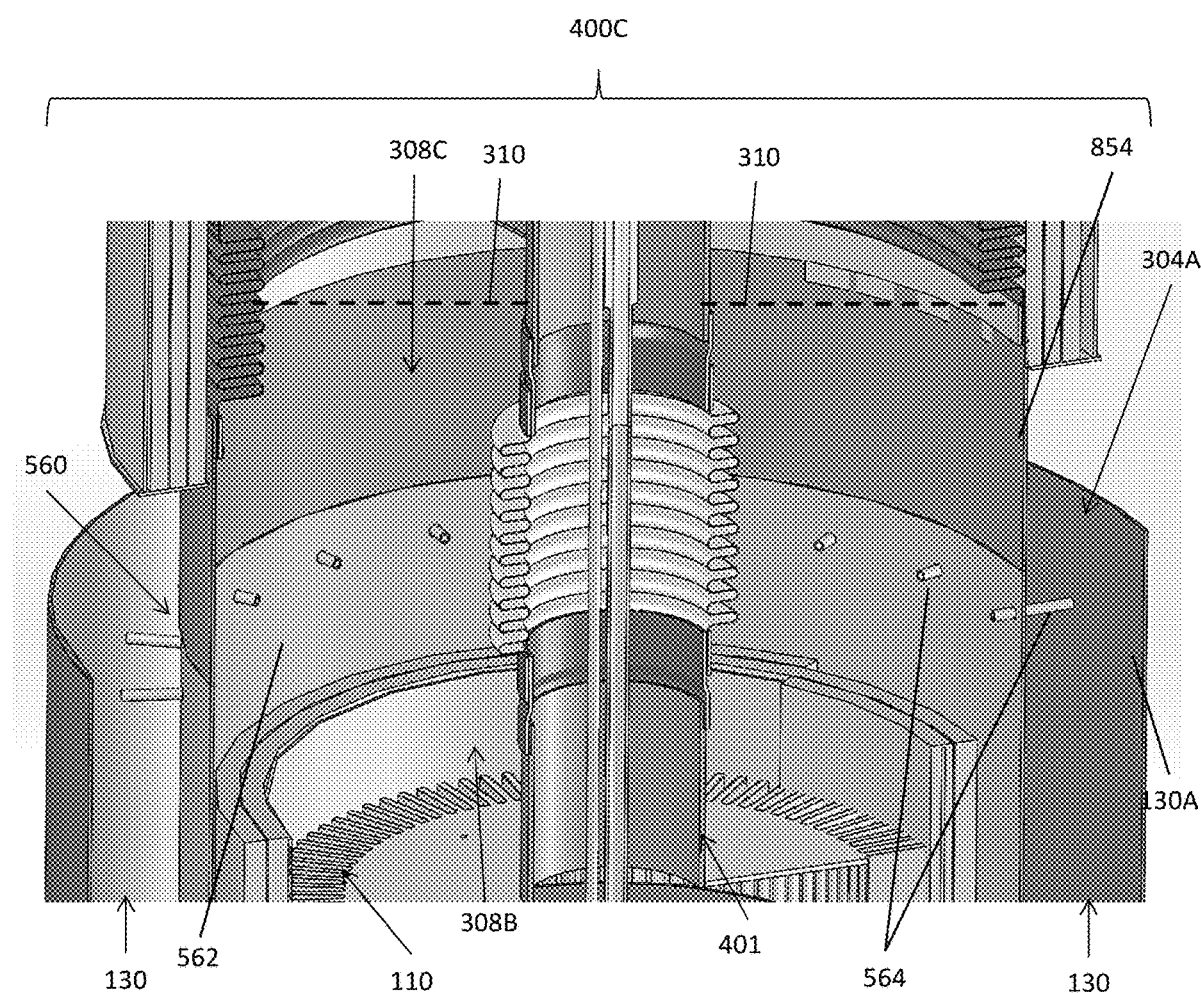
Figure 9B:
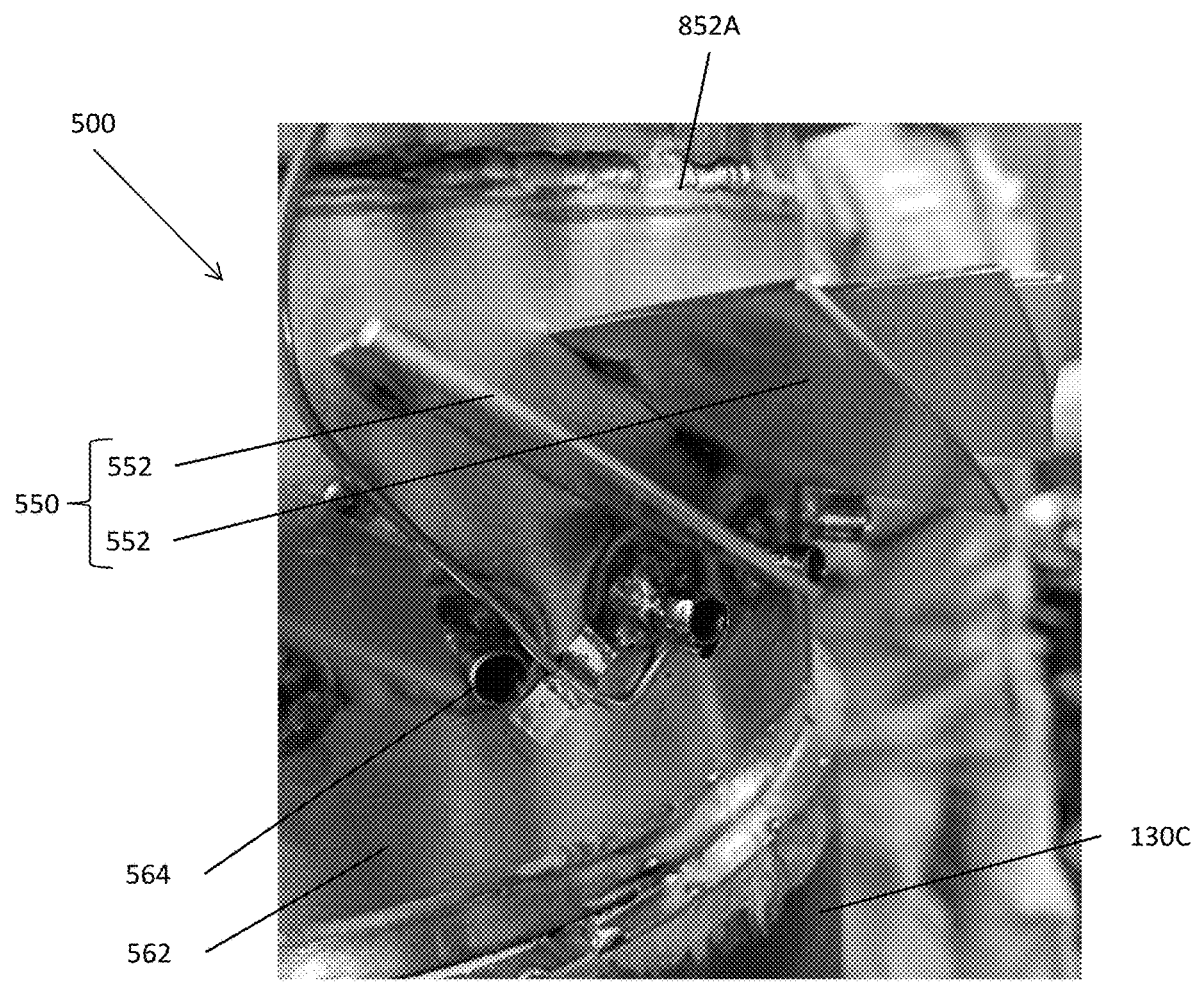
FIG. 9B is a photograph showing the outer surface of the ATO injector of FIG. 9A.

FIG. 9A is a partial perspective view of the central column of 400C including an alternative splitter 560 that may be included in the ATO injector 500 of FIG. 5 instead of the splitter 510, according to another alternative embodiment of the present disclosure. FIG. 9B is a photograph showing the outer surface of the ATO injector 500 of FIG. 9A. Referring to FIGS. 9A and 9B, the ATO injector 500 may include the splitter 560 containing hollow cylindrical body 562 having an upper edge attached (e.g., welded) to the supporting cylinder 854 and a lower edge attached (e.g., welded) to the inner cylinder 130C (shown in FIG. 8A) of the ATO 130 or may comprise an upper part of the inner cylinder 130C.

In some embodiments, the cylindrical body 562 may be cut from a metal tube, or may be formed by bending and welding a flat metal sheet into a hollow cylindrical shape. For example, the cylindrical body 562 may extend vertically and may have a single radius of curvature in a horizontal direction. In other words, the cylindrical body 562 may have a consistent horizontal cross-section and/or circumference, and does not have a convex arcuate body which extends toward the inner cylinder 130A past the inner cylinder 130C.

The splitter 560 includes injection tubes 564 (instead of the slits of the prior embodiments) that extend through the cylindrical body 562. The injection tubes 564 may be configured to inject anode exhaust from inside the cylindrical body 562 into cathode exhaust flowing outside of the cylindrical body 562 and into the ATO 130. In particular, the injection tubes 564 may extend from an outer surface of the cylindrical body 562 by a distance ranging from about 0.5 cm to about 3 cm, such as from about 1 cm to about 2.5 cm, or from about 1.25 cm to about 2.25 cm. Accordingly, the injection tubes 564 may be configured to inject anode exhaust into an annular space formed between the cylindrical body 562 and the outer cylinder 130A.

FIGS. 9A and 9B show the injection tubes perpendicular to the axis (i.e., central vertical axis of the cylindrical body 562). In an alternative embodiment, the injection tubes may be slanted down in the direction of cathode exhaust flow (e.g., in the direction of the ATO). The downward angle may be 1 to 89 degrees, such as 30 to 60 degrees with respect to the vertical direction of the axis of the cylindrical body 562. FIG. 9B shows the injection tubes 564 in the same horizontal plane as the bottom of the optional vanes 552. In an alternative configuration, the injection tubes 564 may be located below the bottom horizontal plane of the vanes 552.

In one embodiment shown in FIGS. 1D and 9A, the conduit 308C may be capped with a cap 310. The cap 310 may comprise a solid metal plate which blocks gases from passing through conduit 308C when the system 10 is operated on hydrogen fuel.

Figure 9C:
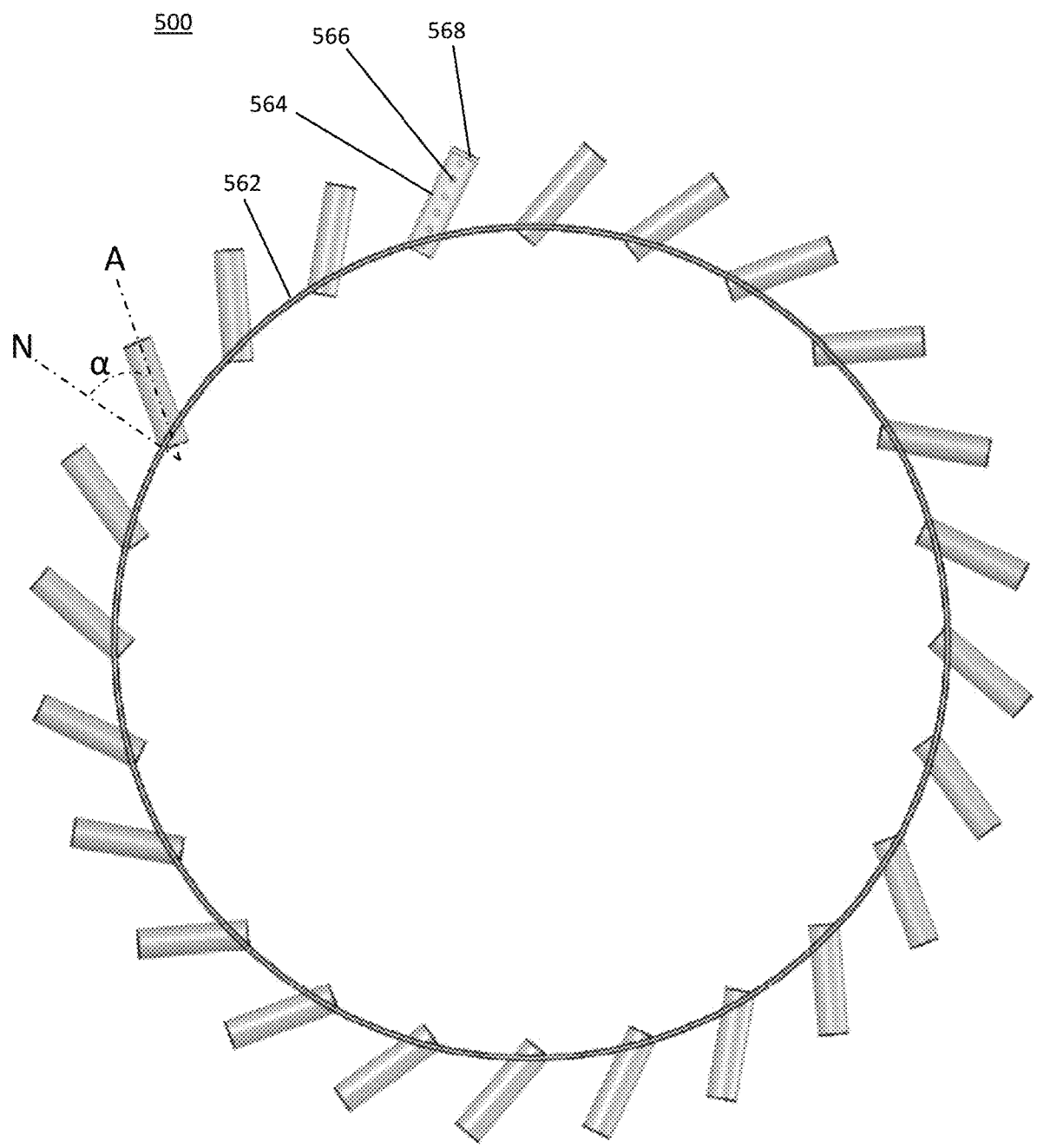
FIGS. 9C, 9F, 9G and 9H are top views of alternative injectors that may be included in the ATO injector of FIG. 9A.
Figure 9D:
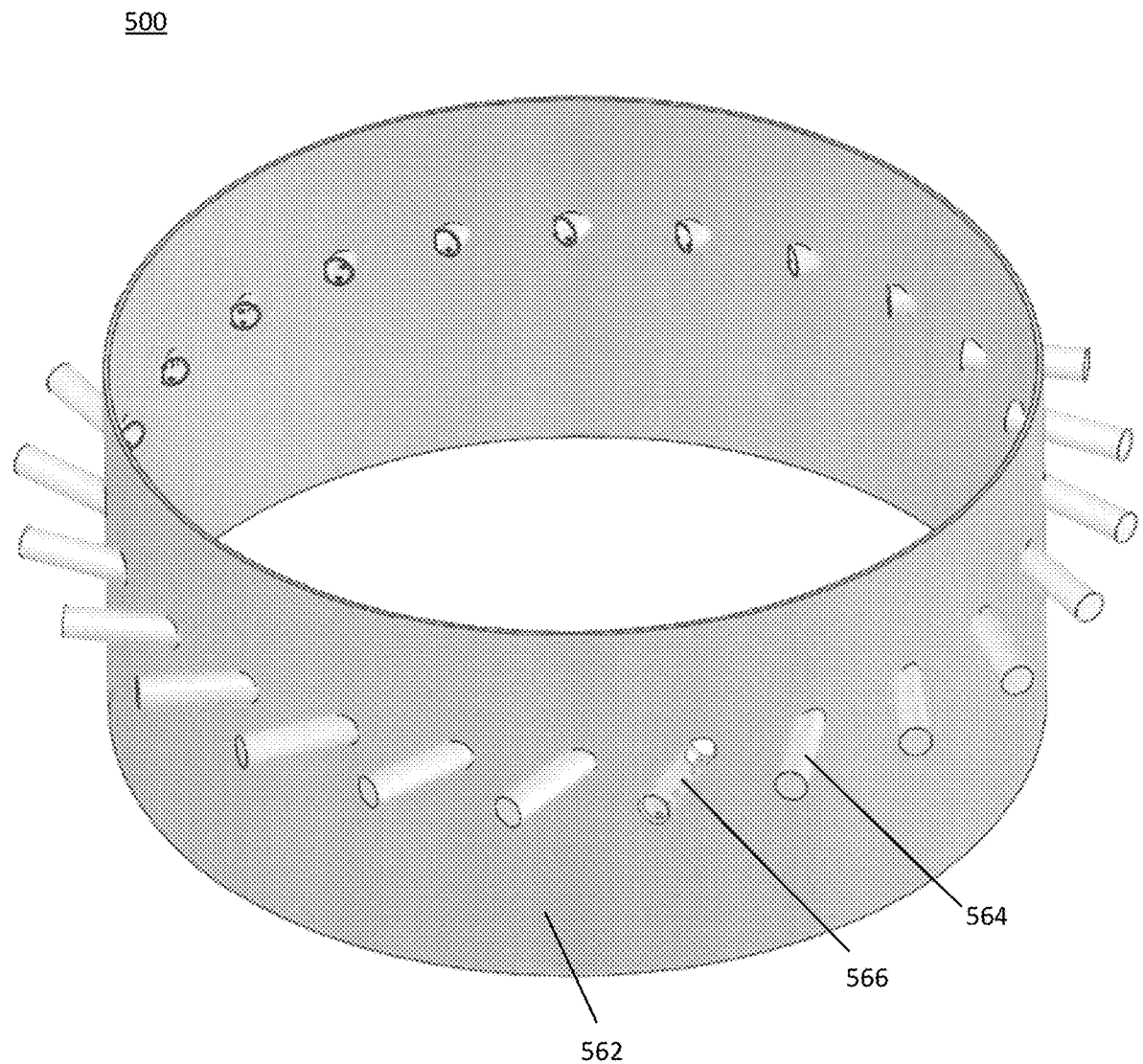
FIGS. 9D and 9E are side and bottom perspective views of the injectors shown in FIG. 9C.
Figure 9E:
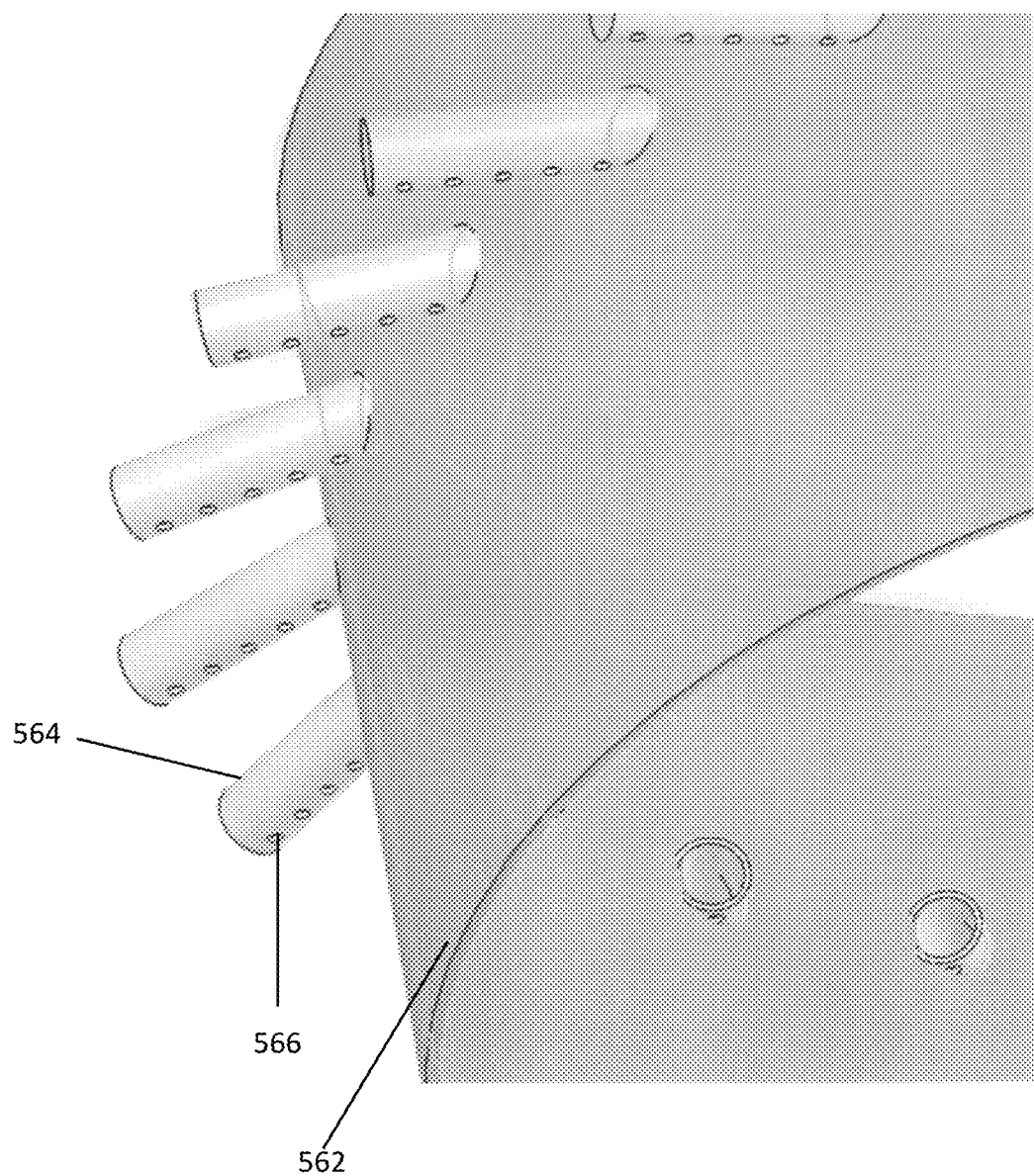
Figure 9F:
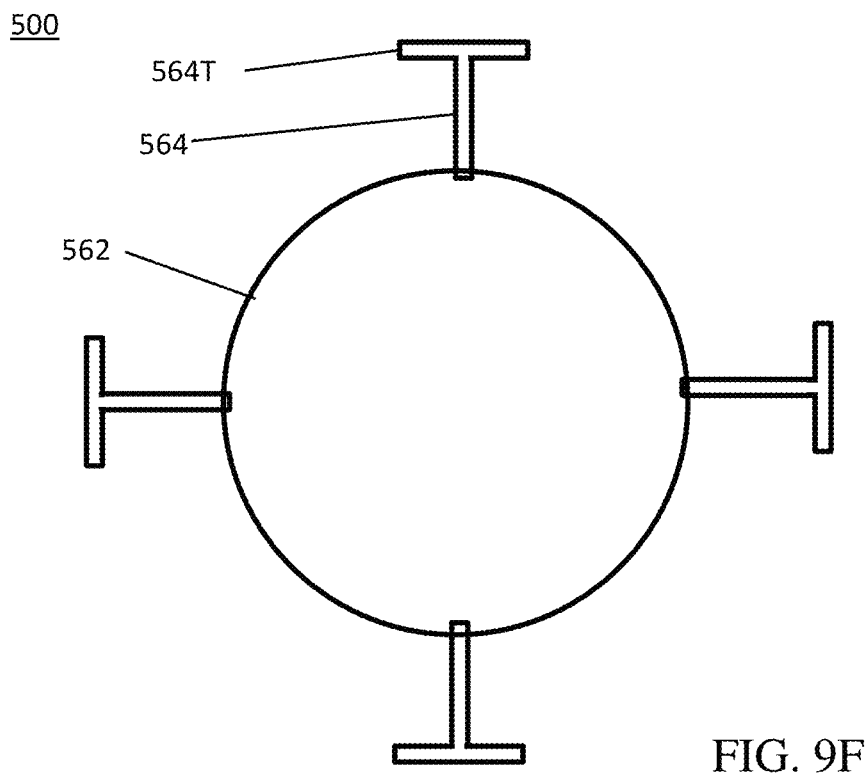
Figure 9G:
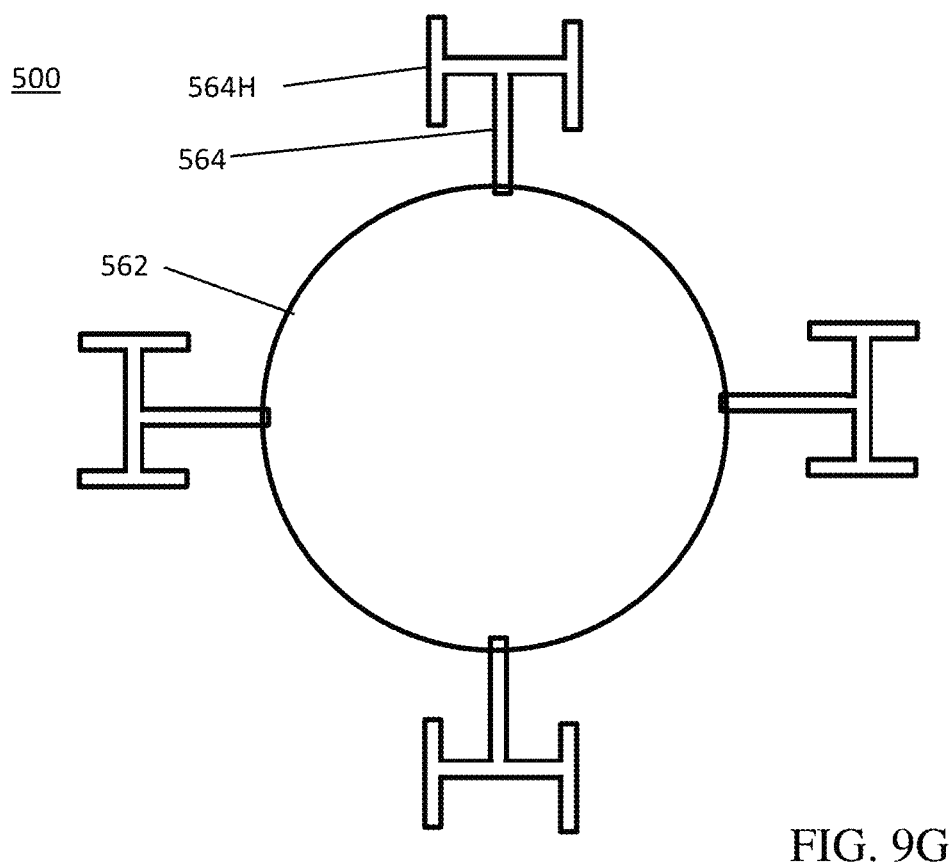

In the configuration shown in FIGS. 9A and 9B, the ATO injector 500 includes optional vanes 552 of the vortex generator 550. In an alternative configuration shown in FIGS. 9C, 9D and 9E, the vanes 552 may be omitted and the vortex may be formed by radially angling the injection tubes 564 relative to the cylindrical body 562. For example, as shown in FIG. 9C, the injection tubes 564 extend from the cylindrical body 562 at a non-zero angle α between an imaginary line "N" normal to the outer surface of the cylindrical body and a lengthwise axis "A" of each of the respective injection tubes 564. The angle α may be the same for all injection tubes 564, or may be different for different injection tubes 564 of the same ATO injector 500. For example, the angle α may range between 1 and 75 degrees, such as 30 to 60 degrees. Optionally, the injection tubes 564 may be angled radially as shown in FIGS. 9C-9E and slanted down as described above at the same time. In another optional configuration, the vanes 552 may be included in the ATO injector 500 of FIGS. 9C-9E.

In one optional aspect of the ATO injector 500 of FIGS. 9C-9E, the injection tubes 564 may include openings 566 (e.g., cylindrical openings or elongated slits) in their circumference, as shown in FIG. 9E and as shown in partial cutaway view in one injection tube 564 in FIGS. 9C and 9D. Thus, the ATO injector 500 comprises a showerhead type injector. The openings 566 may be provided in the lower portion of the circumference of the injection tubes 564, such as in the lower half of the circumference (e.g., at between 90 and 270 degrees) of the injection tubes 564. For example, the openings 566 may face straight down into the ATO 130 (e.g., at the 6 o'clock position which corresponds to 180 degrees on the circumference) or may be located at and/or between 5 or 7 o'clock positions on the circumference of the injection tubes 564.

In one optional configuration shown in FIG. 9C, the ends of the injection tubes 564 may be capped with a cap 568. In this configuration, the anode exhaust flow is directed downward into the ATO 130 rather than in a horizontal direction away from the cylindrical body 562. The openings 566 and/or the caps 568 may also optionally be formed on the injection tubes 564 shown in FIGS. 9A and 9B.

In other alternative embodiments, any of injection tubes 564 described above may be "fractalized" to minimize the perforations into the cylindrical body 562, such that less injection tubes 564 perforate the cylindrical body 562. In these embodiments, the injection tubes 964 include at least one branch (964T, 964H, 964C) that extends at a non-zero angle away from the lengthwise axis "A" of the injection tubes 964. In one alternative embodiment shown in FIG. 9F, instead of using a single injection tube, two tubes 964, 964T form a "T" shape. In another alternative embodiment shown in FIG. 9G, a single tube 964 may be connected to the middle tube of an "H" shaped set of tubes 964H, either from the same horizontal plane as the tubes 964H or directed downward into the middle tube of the tubes 964H from above. The ends of the tubes 964T and 964H may be capped with the caps 968 and the tubes 964T and 964H may include the openings 966 in the bottom parts of their circumference.

Figure 9H:
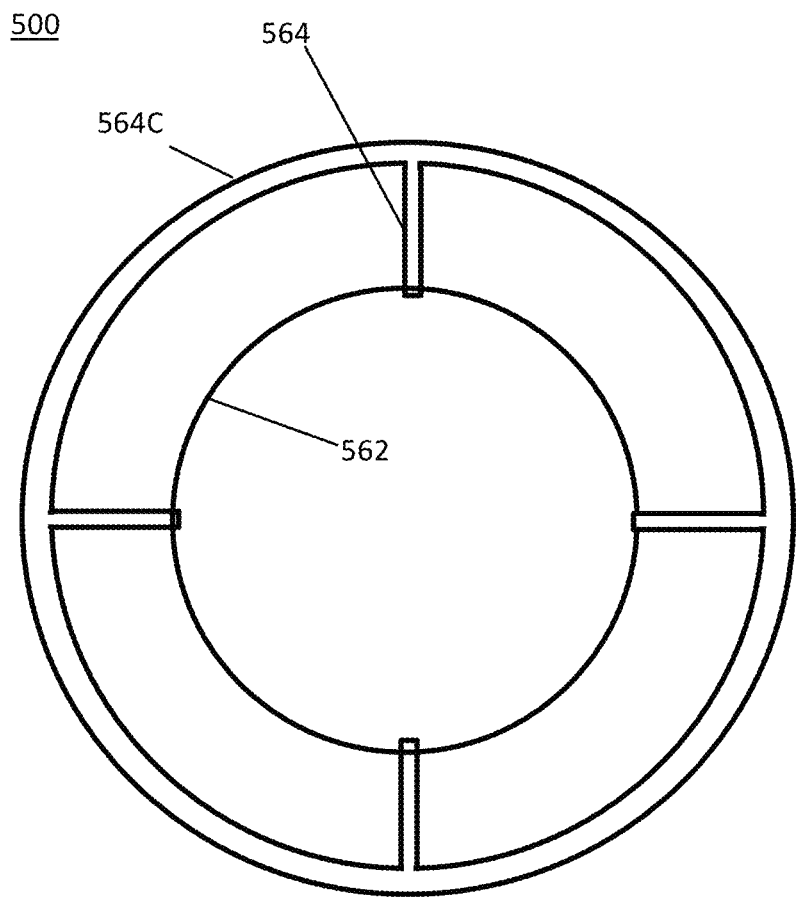

In yet another alternative embodiment shown in FIG. 9H, a smaller number of injection tubes 964 (e.g. two to ten, such as four to six tubes) are connected to a toroidal tube (e.g., cylinder) 964C with the openings 966 (not shown in top view of FIG. 9H) located on the bottom part of its circumference. While the injection tubes 964, 964T, 964H, 964C are illustrated as having a circular cross sectional shape (i.e., as having a cylindrical shape), the tubes may have another cross sectional shape, such as an oval or polygonal (e.g., rectangular) cross sectional shape.

In other words, in all of the above configurations of FIGS. 9A-9H, the injection tubes 564 extend radially outward from the cylindrical body 562, so as to inject the anode exhaust further from the outer surface of the cylindrical body 562, as compared to injection apertures or perforations formed directly in the cylindrical body of the prior embodiments. As a result, the relatively hot anode exhaust is mixed with the relatively cool cathode exhaust prior to contacting the outer surface of the cylindrical body 562. Therefore, the cylindrical body 562 may be maintained at a lower temperature than if injection apertures were used. Therefore, the cylindrical body 562 and the adjacent supporting cylinder 854 and inner cylinder 130C may be maintained at substantially the same temperature during system operation, and stress from thermal expansion variations may be minimized or prevented.

In addition, the extension of the injection tubes 564 also injects the anode exhaust deeper into a vortex formed by the optional vanes 552 of the vortex generator 550. As shown in FIG. 9B, the vanes 552 may be disposed at an angle ranging from about 30° to about 60°, such as from about 35° to about 55°, or from about 40° to about 50°, with respect to a flow direction of the cathode exhaust provided thereto (e.g., with respect to a vertical axis of the central column 400C) in order to generate the vortex and/or increase mixing of the anode and cathode exhaust.

In addition, as compared designs that include two radii of curvature such as curved arcs or cylinders shown in FIGS. 5-8B, the cylindrical body 562 includes only a single radius of curvature. As a result, the splitter 560 may be less expensive to manufacture. Further, since the cylindrical body 562 does not protrude into the annular space above the ATO 130, the pressure drop in the cathode exhaust generated by splitter 560 may be minimized.

In the embodiment illustrated in FIGS. 9A-9H, the fuel cell system 10 includes a fuel cell stack 102, an anode tail gas oxidizer (ATO) 130, an ATO injector 500 configured to mix a first portion of an anode exhaust from the fuel cell stack 102 with a cathode exhaust from the fuel cell stack and to provide a mixture of the first portion of the anode exhaust and the cathode exhaust into the ATO 130, an anode exhaust conduit 308B which is configured to provide the first portion of the anode exhaust into the ATO injector 500, and cathode exhaust conduit 304A which is configured to provide at least a portion of the cathode exhaust from the fuel cell stack 102 into the ATO injector 500. The ATO injector 500 includes a hollow cylindrical body 562, and injection tubes 564 extending from an outer surface of the hollow cylindrical body 562 and configured to inject the first portion of the anode exhaust into the swirled cathode exhaust.

In one embodiment, the system 10 may also include an anode recuperator heat exchanger 110 configured to exchange heat between the anode exhaust and a fuel inlet stream, and an anode exhaust outlet conduit 308A configured to provide the anode exhaust from the fuel cell stack 102 into the anode recuperator heat exchanger 110, wherein the anode exhaust conduit 308B configured to provide the anode exhaust from the anode recuperator heat exchanger 110 to the ATO injector 500.

In one embodiment, vanes 552 are disposed on the outer surface of the hollow cylindrical body 562 and configured swirl the cathode exhaust, the ATO 130 surrounds the anode recuperator heat exchanger 110, the ATO injector 500 is located upstream (e.g., above in a top down flow) of the ATO 130 and downstream (and above) the anode recuperator heat exchanger 110, the hollow cylindrical body 562 comprises an inner surface of the cathode exhaust conduit 304A, and an outer surface of the anode exhaust conduit 308B, and the injection tubes 564 are located upstream of (e.g., above in a top down flow) the ATO 130 and downstream of (e.g., below) the vanes 552 and the cathode exhaust conduit 304A. In one embodiment, the vanes 522 are disposed at angle ranging from about 30° to about 60° with respect to a flow direction of the cathode exhaust in the cathode exhaust conduit 304A.

In one embodiment, the system 10 also includes a first anode exhaust recycling conduit 308C located above the anode exhaust conduit 308B, the ATO injector 500 and the anode recuperator heat exchanger 110, and an anode cooler heat exchanger 140 located above the first anode exhaust recycling conduit 308C, and configured to heat an air inlet stream provided to the fuel cell stack 102 using a second portion of the anode exhaust provided from the first anode exhaust recycling conduit, and a second anode exhaust recycling conduit 308E configured to recycle the second portion of the anode exhaust from the anode cooler heat exchanger 140 into the fuel inlet stream.

In one embodiment, the injection tubes 564 extend radially from the outer surface of the hollow cylindrical body 562 by a distance ranging from about 0.5 cm to about 3 cm, and the injection tubes 564 comprise a splitter 510 which is configured to split the anode exhaust into the first and the second portions. The cylindrical body 562 extends vertically between the anode exhaust conduit 308B and the ATO 130, and has a single radius of curvature in a horizontal direction. The ATO 130 contains a fuel oxidation catalyst which is configured to oxidize the mixture of the cathode exhaust and the first portion of the anode exhaust.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A fuel cell system, comprising:
a fuel cell stack;
an anode recuperator heat exchanger configured to receive an anode exhaust from the fuel cell stack;
an anode exhaust conduit configured to receive the anode exhaust from the anode recuperator;
a cathode exhaust conduit configured to receive a cathode exhaust from the fuel cell stack;

an anode tail gas oxidizer (ATO) surrounding the anode recuperator and configured to receive the cathode exhaust from the cathode exhaust conduit; and
an ATO injector located between the ATO and the anode exhaust conduit, the ATO injector comprising:
vanes configured to swirl the cathode exhaust provided from the cathode exhaust conduit; and
an arcuate body disposed between the anode exhaust conduit and the ATO and through which at least a portion of the anode exhaust is configured to flow from the anode exhaust conduit, the arcuate body comprising injection apertures configured to inject at least a portion of the anode exhaust into the swirled cathode exhaust flowing to the ATO;
wherein the arcuate body comprises a toroidal conduit having an arc measure of 360° taken along an outer surface of the toroidal conduit; and
wherein the toroidal conduit further comprises inner apertures configured to direct the first portion of the anode exhaust from the anode exhaust conduit into the toroidal conduit.

2. The system of claim 1, wherein the inner apertures are larger than the injection apertures.

3. A fuel cell system, comprising:
a fuel cell stack;
an anode recuperator heat exchanger configured to receive an anode exhaust from the fuel cell stack;
an anode exhaust conduit configured to receive the anode exhaust from the anode recuperator;
a cathode exhaust conduit configured to receive a cathode exhaust from the fuel cell stack;
an anode tail gas oxidizer (ATO) surrounding the anode recuperator and configured to receive the cathode exhaust from the cathode exhaust conduit;
an ATO injector located between the ATO and the anode exhaust conduit, the ATO injector comprising:
vanes configured to swirl the cathode exhaust provided from the cathode exhaust conduit; and
an arcuate body disposed between the anode exhaust conduit and the ATO and through which at least a portion of the anode exhaust is configured to flow from the anode exhaust conduit, the arcuate body comprising injection apertures configured to inject at least a portion of the anode exhaust into the swirled cathode exhaust flowing to the ATO, wherein the arcuate body comprises a toroidal conduit having an arc measure of 360° taken along an outer surface of the toroidal conduit;
a supply tube configured to provide the anode exhaust from the anode exhaust conduit to the inside of the toroidal conduit; and
a valve configured to control the anode exhaust flow through the supply tube.

4. The system of claim 3, wherein the valve is disposed outside a hotbox containing the anode recuperator heat exchanger, the anode exhaust conduit, the ATO, and the ATO injector.

5. The system of claim 3, further comprising a carbon dioxide separator fluidly connected to the anode exhaust conduit and to the supply tube, wherein the carbon dioxide separator is configured to separate carbon dioxide from the anode exhaust.

6. The system of claim 5, wherein the carbon dioxide separator comprises an electrochemical carbon dioxide separator.

7. The system of claim 5, further comprising:
an anode exhaust cooler heat exchanger configured to heat an air inlet stream using the anode exhaust; and
a mixer configured to mix a portion of the anode exhaust with a fuel inlet stream flowing to the anode recuperator heat exchanger.

8. The system of claim 7, wherein:
the anode exhaust conduit bypasses and is not directly fluidly connected to the toroidal conduit;
an inner surface of the toroidal conduit does not have any openings exposed to the anode exhaust conduit;
the carbon dioxide separator is located between the anode exhaust cooler heat exchanger and the mixer in a path of the anode exhaust; and
the anode exhaust conduit connects an outlet of the anode exhaust cooler heat exchanger to an inlet of the carbon dioxide separator.

9. The system of claim 8, further comprising:
a purified anode exhaust conduit connected to a first outlet of the carbon dioxide separator;
a carbon dioxide outlet conduit connected to a second outlet of the carbon dioxide separator;
a splitter fluidly connected to the purified anode exhaust conduit; and
a mixer conduit fluidly connecting the splitter to the mixer, wherein the supply tube fluidly connects the splitter to the toroidal conduit.

10. The system of claim 3, wherein the fuel cell stack comprises a solid oxide fuel cell stack.

11. A method of operating a fuel cell system, comprising:
providing at least a portion of a cathode exhaust from a fuel cell stack into an anode tail gas oxidizer (ATO) injector comprising a toroidal conduit containing injection conduits and vanes, wherein the fuel cell stack and the ATO injector are located in a hotbox;
swirling the cathode exhaust in the ATO injector using the vanes;
providing an entire anode exhaust from the fuel cell stack outside the hotbox past the ATO injector;
providing at least a first portion of the anode exhaust from the outside the hotbox into the ATO injector;
injecting at least the first portion of the anode exhaust from the toroidal conduit through the injection apertures into the swirled cathode exhaust; and
providing a mixture of the at least the first portion of the anode exhaust and the swirled cathode exhaust into an anode tail gas oxidizer (ATO).

12. The method of claim 11, further comprising:
providing at least the first portion of the anode exhaust from outside the hotbox into the toroidal conduit of the ATO injector through plural supply tubes; and
controlling a flow of at least the first portion of the anode exhaust through the plural supply tubes using a valve located outside the hotbox.

13. The method of claim 11, further comprising:
providing the anode exhaust from the fuel cell stack into an anode recuperator heat exchanger; and
exchanging heat between the anode exhaust and a fuel inlet stream.

14. The method of claim 13, wherein:
the fuel inlet stream comprises a pure hydrogen fuel inlet stream or a hydrocarbon fuel inlet stream;
the ATO surrounds the anode recuperator heat exchanger;
the ATO injector is located above the ATO and the anode recuperator heat exchanger; and
the ATO injector is located above the ATO.

15. The method of claim 14, further comprising:
passing all anode exhaust from the anode recuperator heat exchanger past the toroidal conduit and into a carbon dioxide separator located outside the hotbox to separate carbon dioxide from the anode exhaust;
passing the first portion of the anode exhaust from the carbon dioxide separator into the toroidal conduit; and
recycling the second portion of the anode exhaust from the carbon dioxide separator into a fuel inlet stream provided into the fuel cell stack.

* * * * *